(12) United States Patent
Ichioka et al.

(10) Patent No.: US 6,791,634 B2
(45) Date of Patent: Sep. 14, 2004

(54) DISPLAY DEVICE HAVING CONNECTING PADS CROSSING A SPARE LINE

(75) Inventors: Hideki Ichioka, Nabari (JP); Tomohiko Yamamoto, Nara (JP); Keiichi Tanaka, Tenri (JP); Naoto Inoue, Shiki-gun (JP); Koji Fujiwara, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 10/347,191

(22) Filed: Jan. 21, 2003

(65) Prior Publication Data

US 2003/0137629 A1 Jul. 24, 2003

(30) Foreign Application Priority Data

Jan. 18, 2002 (JP) ........................................ 2002-010093

(51) Int. Cl.[7] .......................................... G02F 1/1343
(52) U.S. Cl. ............................ 349/55; 349/54; 349/192
(58) Field of Search ............................ 349/54, 55, 192

(56) References Cited

U.S. PATENT DOCUMENTS

| | | | |
|---|---|---|---|
| 4,694,287 A | | 9/1987 | Chenevas-Paule et al. |
| 4,807,973 A | * | 2/1989 | Kawasaki .................. 349/192 |
| 5,268,678 A | | 12/1993 | Nakazawa et al. |
| 5,684,547 A | * | 11/1997 | Park et al. ..................... 349/54 |
| 5,796,449 A | * | 8/1998 | Song ............................. 349/54 |
| 6,288,765 B1 | * | 9/2001 | Tanaka et al. ............... 349/153 |
| 6,380,992 B1 | * | 4/2002 | Lee .............................. 349/54 |

FOREIGN PATENT DOCUMENTS

JP          5-165060 A         6/1993

* cited by examiner

*Primary Examiner*—Tarifur R. Chowdhury
*Assistant Examiner*—Andrew Schechter
(74) *Attorney, Agent, or Firm*—Nixon & Vanderhye, P.C.

(57) ABSTRACT

A display device includes: a first substrate including data electrodes and first and second groups of connecting pads; a second substrate, which faces the first substrate and which includes data signal input terminals, a spare line, and third and fourth groups of connecting pads opposed to the first and second groups of connecting pads, respectively; and a display medium layer interposed between the first and second substrates. The data signal input terminals are connected to the third group of connecting pads. In case of disconnection, a data signal to be supplied to one of the data electrodes may be input through the spare line. The fourth group of connecting pads crosses the spare line with an insulating layer interposed between them. Each pair of connecting pads in the first and third groups or the second and fourth groups is electrically connected together with an anisotropic conductive material.

19 Claims, 15 Drawing Sheets

DISPLAY DEVICE HAVING CONNECTING PADS CROSSING A SPARE LINE

BACKGROUND OF THE INVENTION

1. Field of the Invention

The present invention relates to a display device.

2. Description of the Related Art

Liquid crystal display devices are space-saving, easily portable, and lightweight display devices with low power dissipation, and are extensively used today as displays for notebook computers, TV sets with a reduced thickness and cell phones. Among other things, a super twisted nematic (STN) mode liquid crystal display device has found applications in a broad variety of electronic appliances including cell phones. This is because an STN mode liquid crystal display device has a relatively simple structure and is less expensive.

FIG. 13 is a perspective view schematically illustrating the structure of a conventional STN mode liquid crystal display device. As shown in FIG. 13, the STN mode liquid crystal display device includes two substrates 100 and 102 that face each other and a liquid crystal layer 104 interposed between these substrates 100 and 102. On one surface of one substrate 100, multiple striped common lines 106 are provided so as to face the liquid crystal layer 104. On one surface of the other substrate 102, multiple striped segment lines 108 are provided so as to face the liquid crystal layer 104, too. The direction in which the segment lines 108 extend is perpendicular to the direction in which the common lines 106 extend. In this STN mode liquid crystal display device, when a voltage is created between one common line 106 and one segment line 108, a portion of the liquid crystal layer 104, located at the intersection between these lines 106 and 108, is driven by the voltage applied thereto. These common and segment lines 106 and 108 also function as pixel electrodes and are made of a transparent conductive film such as an ITO film.

However, this STN mode liquid crystal display device has no active components as switching elements. Accordingly, the voltage to be applied to the liquid crystal layer is inconstant (i.e., the voltage applied cannot be retained constantly enough). For that reason, a liquid crystal display device of this type cannot fully satisfy various requirements including multi-gray-scale display (in 4,096 or 6,500 colors, for example), high resolution and high contrast ratio.

Thus, a modified STN mode liquid crystal display device, in which active components are provided for respective pixels, was proposed. In a liquid crystal display device of this newly proposed type, a data signal is supplied to one of striped data electrodes on a counter substrate, and a reference signal voltage (i.e., a common voltage) is applied to a pixel electrode that is connected to its associated switching element. This type of liquid crystal display device will be referred to herein as a "data-to-counter-electrode" type liquid crystal display device. A liquid crystal display device of this type is disclosed in U.S. Pat. No. 4,694,287, for example. Hereinafter, the data-to-counter-electrode type liquid crystal display device disclosed in the United States patent identified above will be described with reference to FIG. 14.

As shown in FIG. 14, multiple three-terminal switching elements (i.e., TFTs) 112 and pixel electrodes 114 are arranged in columns and rows (i.e., in matrix), and multiple gate lines 116 and multiple reference signal lines 118 are arranged in the row direction, on one surface of one substrate 110 so as to face a liquid crystal layer. The three terminals of each TFT 112 are connected to its associated pixel electrode 114, gate line 116 and reference signal line 118, respectively. In response to a gate signal that has been supplied to the gate electrode of a TFT 112 through its associated gate line 116, the TFT 112 is turned ON. Then, a reference signal voltage (i.e., common voltage) is applied through its associated reference signal line 118 to its associated pixel electrode 114 by way of the TFT 112 in ON state.

On the surface of the counter substrate 120, multiple striped data electrodes 122 are provided so as to face the liquid crystal layer and cross the gate lines 116 and reference signal lines 118 substantially at right angles when this device is viewed from above. A data (or video) signal is supplied to each of these data electrodes 122. A portion 124 of each data electrode 122 that faces its associated pixel electrode 114 also functions as a counter electrode.

Generally speaking, very precise processing on the order of several microns is required to fabricate a liquid crystal display device. Thus, if dust is deposited on, or a tiny scratch is done on, a liquid crystal display device being fabricated, then current leakage or disconnection is likely caused in the final product. Recently, a liquid crystal display device needs to increase the number of colors to display or its resolution and minimize the non-display area around its periphery. Accordingly, it is often necessary to pattern a conductive film into a desired shape on a color filter layer, an overcoat resin or a stepped portion. The interconnects of a liquid crystal display device also need to decrease their widths. Under the circumstances such as these, the current leakage, disconnection and other defects happen more and more often, which is a major factor of unwanted decrease in production yield.

To overcome these problems, Japanese Laid-Open Publication No. 3-85525, for example, discloses an active-matrix-addressed liquid crystal display device including a spare line to repair a disconnection.

In the liquid crystal display device disclosed in the publication identified above, the spare line to repair a disconnected source or gate line is provided on an active-matrix substrate. That is to say, the spare line and the line to be repaired are located on the same substrate.

In the data-to-counter-electrode type liquid crystal display device shown in FIG. 14, the striped data electrodes 122 are formed on the counter substrate 120 by patterning a transparent conductive film such as an ITO film. Defects such as disconnection of one of these data electrodes 122 often happen on the counter substrate 120. Thus, to repair such a disconnected data electrode 122, a spare line may be provided as in the active-matrix-addressed liquid crystal display device described above for the substrate 120 including the data electrodes 122.

Hereinafter, such a liquid crystal display device will be described with reference to FIGS. 15A through 15C and FIGS. 16A and 16B. FIGS. 15A and 15B are plan views of the two substrates 120 and 110, respectively. FIG. 15C is transparent plan view of the liquid crystal display device. FIGS. 16A and 16B are partial cross-sectional views of the liquid crystal display device shown in FIG. 15C as taken on the planes XVIa—XVIa and XVIb—XVIb, respectively. Each of the components of this liquid crystal display device, having substantially the same function as the counterpart shown in FIG. 14, will be identified by the same reference numeral and the description thereof will be omitted herein.

In this liquid crystal display device, a spare line 124 to repair any defective data electrode 122 is provided on the substrate 120 on which the data electrodes 122 are located as shown in FIG. 15A. The substrate 120 including the data electrodes 122 and spare line 124 will be referred to herein as a "first substrate" for convenience sake. In this structure, if any of the data electrodes 122 has been disconnected, then a gray-scale signal (i.e., data signal) that should have been supplied to the disconnected data electrode 122 is input through the input terminal 132 of the spare line 124.

In the data-to-counter-electrode type liquid crystal display device shown in FIGS. 15A through 15C, the input terminals 122A of the data electrodes 122 and the input terminal 132 of the spare line 124 are provided on the first substrate 120. On the other hand, a driver circuit (such as a driver IC) 128 to supply signals to the data electrodes 122 and the spare line 124 is formed on a flexible printed circuit board 126, which is provided separately from the first substrate 120, as shown in FIG. 15C. This flexible printed circuit board 126 and the first substrate 120 are bonded together by a tape automated bonding (TAB) technique.

As shown in FIGS. 15A and 16B, the spare line 124 crosses the data electrodes 122 at one end 122B of the data electrodes 122 with an insulating film 136 interposed between them. If any of the data electrodes 122 has been disconnected, a portion of the insulating film 136 at the intersection is burned off by a laser beam, thereby electrically connecting the disconnected data electrode 122 and the spare line 124 together. As a result, the data signal that should have been supplied to the disconnected data electrode 122 is input to the spare line 124. In this manner, the disconnected data electrode 122 can be repaired.

The two substrates 120 and 110 of this liquid crystal display device are bonded together with a seal member 139, including spacers 138, as shown in FIGS. 15C, 16A and 16B. A liquid crystal material 140 is injected into the gap between the two substrates 110 and 120. Also, the reference signal lines 118 and the gate lines 116 on the substrate 110 have input terminals 118A and input terminals 116A, respectively, which are connected to another driver circuit 130 as shown in FIG. 15C.

In the liquid crystal display device shown in FIGS. 15A through 16B, however, the spare line 124 is provided on the first substrate 120. Accordingly, a conductive film to be patterned into the spare line 124 and the insulating film 136 to electrically isolate the spare line 124 from the data electrodes 122 need to be additionally formed on the first substrate 120, thus complicating the manufacturing process and decreasing the yield potentially.

Also, the driver circuit 128 for controlling the data electrodes 122 and the spare line 124 is provided on the board 126 separately from the first substrate 120, and the board 126 needs to be bonded to the substrate 120 by the TAB technique, for example. Thus, this device has a complicated structure and might have an excessively large size.

Furthermore, the substrate 120 on which the input terminals 122A of the data electrodes 122 and the input terminal 132 of the spare line 124 are provided is different from the substrate 110 on which the input terminals 116A of the gate lines 116 and the input terminals 118A of the reference signal lines 118 are provided. Accordingly, the manufacturing process should include the process step of inverting the liquid crystal display device to bond the board 126 to the body of the device. In that case, the manufacturing cost might increase and its efficiency might decrease.

SUMMARY OF THE INVENTION

In order to overcome the problems described above, an object of the present invention is to provide a display device with a simplified structure and a disconnection-repairing spare line by a much more easy manufacturing process.

A display device according to a preferred embodiment of the present invention preferably includes: a first substrate; a second substrate, which is disposed so as to face the first substrate; and a display medium layer provided between the first and second substrates. The first substrate preferably includes striped data electrodes, a first group of connecting pads, and a second group of connecting pads. Each of the data electrodes preferably has a first end and a second end and preferably extends in a column direction. Each of the connecting pads in the first group is preferably connected electrically to the first end of associated one of the data electrodes. Each of the connecting pads in the second group is preferably connected electrically to the second end of associated one of the data electrodes. The second substrate preferably includes gate lines, reference signal lines, pixel electrodes, switching elements, data signal input terminals, a spare line, a third group of connecting pads, and a fourth group of connecting pads. The gate and reference signal lines preferably extend in a row direction. The pixel electrodes are preferably arranged in matrix. Each of the switching elements preferably has its ON/OFF states controlled by a voltage applied through associated one of the gate lines and is preferably provided between associated one of the reference signal lines and associated one of the pixel electrodes. Each of the data signal input terminals preferably receives a data signal to be supplied to associated one of the data electrodes. A data signal to be supplied to the data electrode may be passed through the spare line. The third group of connecting pads is preferably connected electrically to the data signal input terminals and is preferably provided so as to face the first group of connecting pads. The fourth group of connecting pads is preferably provided so as to face the second group of connecting pads and preferably crosses the spare line with an insulating layer interposed between them. Each of the connecting pads in the third group is preferably connected electrically to associated one of the connecting pads in the first group with an anisotropic conductive material. Each of the connecting pads in the fourth group is preferably connected electrically to associated one of the connecting pads in the second group with the anisotropic conductive material.

In one preferred embodiment of the present invention, a seal region is preferably provided between the periphery of the first substrate and the periphery of the second substrate. The first and second substrates are preferably bonded together with a seal member in the seal region. The seal member preferably includes the anisotropic conductive material. The first, second, third and fourth groups of connecting pads are preferably all located in the seal region.

In another preferred embodiment, the spare line may cross the third group of connecting pads with the insulating layer interposed between the spare line and the third group of connecting pads.

In still another preferred embodiment, the spare line may cross the fourth group of connecting pads inside of the seal region with the insulating layer interposed between the spare line and the fourth group of connecting pads.

In yet another preferred embodiment, the spare line may cross the third group of connecting pads inside of the seal region with the insulating layer interposed between the spare line and the third group of connecting pads.

In yet another preferred embodiment, the spare line may cross the fourth group of connecting pads outside of the seal region with the insulating layer interposed between the spare line and the fourth group of connecting pads.

In yet another preferred embodiment, the spare line may cross the third group of connecting pads outside of the seal region with the insulating layer interposed between the spare line and the third group of connecting pads.

In yet another preferred embodiment, each of the connecting pads in the fourth group preferably has a first portion with a first width and a second portion with a second width that is smaller than the first width. The second portion of each of the connecting pads in the fourth group preferably crosses the spare line.

In yet another preferred embodiment, each of the connecting pads in the third group preferably has a first portion with a first width and a second portion with a second width that is smaller than the first width. The second portion of each of the connecting pads in the third group preferably crosses the spare line.

In yet another preferred embodiment, the spare line preferably includes multiple branches that extend substantially vertically to the spare line itself. The branches of the spare line preferably cross the second portions of the connecting pads in the fourth group.

In yet another preferred embodiment, the spare line preferably includes multiple branches that extend substantially vertically to the spare line itself. The branches of the spare line preferably cross the second portions of the connecting pads in the third group.

In yet another preferred embodiment, each of the connecting pads in the fourth group may have multiple portions with the second width.

In yet another preferred embodiment, each of the connecting pads in the third group may have multiple portions with the second width.

In yet another preferred embodiment, each of the data electrodes is preferably combined with associated one of the connecting pads in the first group and with associated one of the connecting pads in the second group.

In yet another preferred embodiment, the display medium layer preferably includes a liquid crystal material or an organic EL material.

In yet another preferred embodiment, a portion of the insulating layer, which is located at an intersection between one of the connecting pads in the fourth group and the spare line, is preferably removed, thereby electrically connecting the connecting pad in the fourth group to the spare line.

In this particular preferred embodiment, another portion of the insulating layer, which is located at an intersection between one of the connecting pads in the third group and the spare line, is preferably removed, thereby electrically connecting the connecting pad in the third group to the spare line.

Another preferred embodiment of the present invention provides a method of repairing disconnected one of the data electrodes for the display device according to any of the preferred embodiments of the present invention described above. The method preferably includes the steps of: detecting the disconnected data electrode; and selectively removing a portion of the insulating layer, which is present at an intersection between one of the connecting pads, belonging to the fourth group and associated with the disconnected data electrode, and the spare line, thereby electrically connecting the connecting pad in the fourth group to the spare line.

In one preferred embodiment of the present invention, the method preferably further includes the step of selectively removing another portion of the insulating layer, which is present at an intersection between one of the connecting pads, belonging to the third group and associated with the disconnected data electrode, and the spare line, thereby electrically connecting the connecting pad in the third group to the spare line.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 1A, 1B and 1C schematically illustrate a display device according to a preferred embodiment of the present invention wherein:

FIG. 1A is a plan view of the first substrate thereof;

FIG. 1B is a plan view of the second substrate thereof; and

FIG. 1C is a cross-sectional view of the second substrate as taken on the plane Ic—Ic shown in FIG. 1B.

FIGS. 2A, 2B and 2C schematically illustrate a liquid crystal display device according to a specific preferred embodiment of the present invention wherein:

FIG. 2A is a plan view of the first substrate thereof;

FIG. 2B is a plan view of the second substrate thereof; and

FIG. 2C is a transparent plan view of the liquid crystal display device.

FIGS. 8A, 8B and 8C schematically illustrate a liquid crystal display device according to another specific preferred embodiment of the present invention wherein:

FIG. 8A is a plan view of the first substrate thereof;

FIG. 8B is a plan view of the second substrate thereof; and

FIG. 8C is a transparent plan view of the liquid crystal display device.

FIGS. 11A, 11B and 11C schematically illustrate a liquid crystal display device according to still another specific preferred embodiment of the present invention wherein:

FIG. 11A is a plan view of the first substrate thereof;

FIG. 11B is a plan view of the second substrate thereof; and

FIG. 11C is a transparent plan view of the liquid crystal display device.

FIGS. 15A, 15B and 15C schematically illustrate a conventional liquid crystal display device wherein:

FIG. 15A is a plan view of the first substrate thereof;

FIG. 15B is a plan view of the second substrate thereof; and

FIG. 15C is a transparent plan view of the liquid crystal display device.

DETAILED DESCRIPTION OF PREFERRED EMBODIMENTS

Figure 1A:
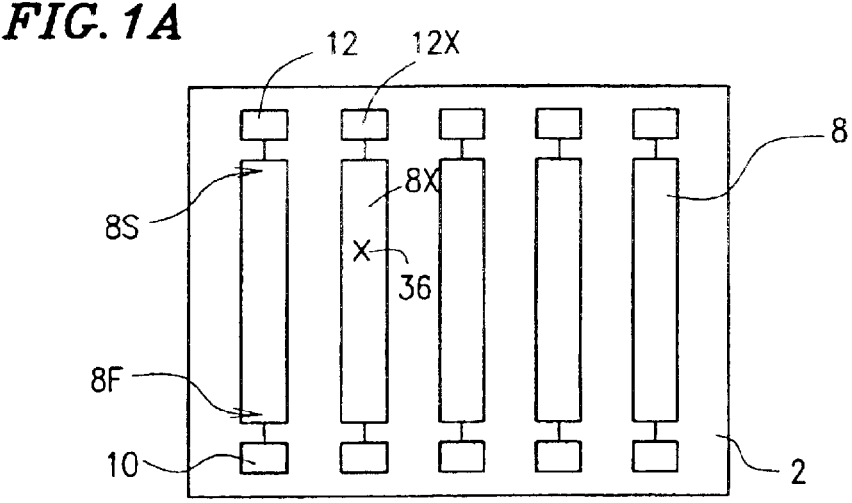
Figure 1B:
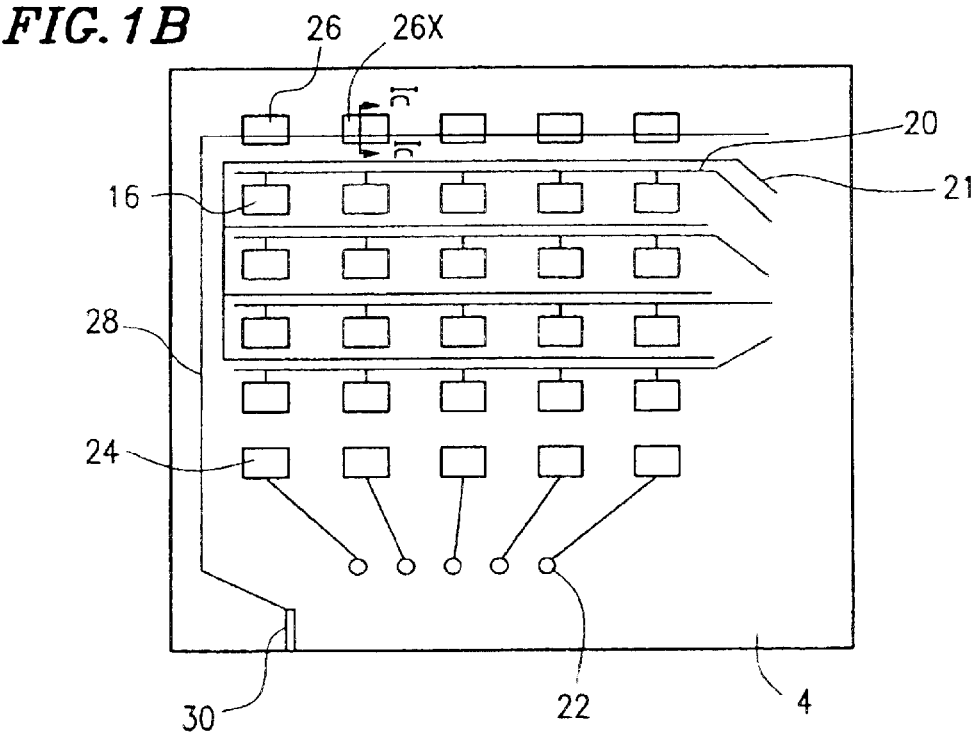
Figure 1C:
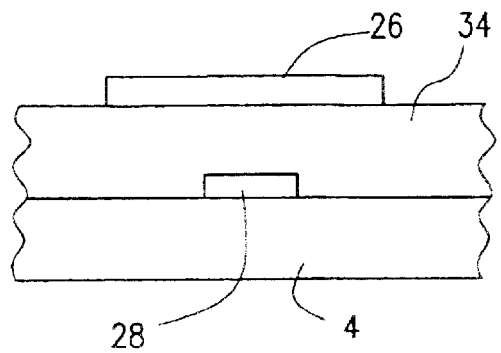

Hereinafter, a display device according to a preferred embodiment of the present invention will be described with reference to FIGS. 1A through 1C. The display device of this preferred embodiment is preferably implemented as a data-to-counter-electrode type. The display medium layer of this display device may be made of a liquid crystal material or an organic EL material, for example. FIGS. 1A and 1B are respectively plan views of the first and second substrates of the display device. FIG. 1C is a partial cross-sectional view of the second substrate shown in FIG. 1B as taken on the plane Ic—Ic.

The display device of this preferred embodiment includes the first substrate 2 shown in FIG. 1A, the second substrate 4 shown in FIG. 1B, and the display medium layer (not shown). The first and second substrates 2 and 4 face each other with the display medium layer interposed between them.

As shown in FIG. 1A, multiple striped data electrodes 8 are provided on the surface of the first substrate 2 so as to face the display medium layer. The data electrodes 8 extend parallelly to each other in a column direction. Each of the data electrodes 8 has a first end 8F and a second end 8S. On the same surface of the first substrate 2, a first group of connecting pads 10 and a second group of connecting pads 12 are provided so as to face the display medium layer, too. Each of the connecting pads 10 in the first group is electrically connected to the first end 8F of its associated data electrode 8. Each of the connecting pads 12 in the second group is electrically connected to the second end 8S of its associated data electrode 8.

On the surface of the second substrate 4 on the other hand, pixel electrodes 16, switching elements (not shown), gate lines 20, reference signal lines 21, data signal input terminals 22, at least one spare line 28, a third group of connecting pads 24 and a fourth group of connecting pads 26 are provided so as to face the display medium layer as shown in FIG. 1B. The pixel electrodes 16 are arranged in columns and rows (i.e., in matrix). Each of the switching elements is electrically connected to associated one of the pixel electrodes 16. The gate lines 20 and reference signal lines 21 both extend in a row direction. Should any of the data electrodes 8 on the first substrate 2 have gone defective (e.g., disconnected), the spare line 28 would be used to repair the defective data electrode 8.

Although not shown, each of the switching elements is provided between associated one of the reference signal lines 21 and associated one of the pixel electrodes 16 and has its ON/OFF states controlled by a voltage to be applied through its associated gate line 20. Each of the data signal input terminals 22 receives a data signal to be supplied to its associated data electrode 8. A data signal to be supplied to one of the data electrodes 8 may be input through the spare line 28. That is to say, in case any of the data electrodes 8 has been disconnected, a data signal that should have been supplied to the disconnected data electrode 8 may be input through the spare line 28.

Each of the connecting pads 24 in the third group is electrically connected to its associated data signal input terminal 22, and is provided so as to face its associated connecting pad 10 in the first group on the first substrate 2. On the other hand, each of the connecting pads 26 in the fourth group is provided so as to face its associated connecting pad 12 in the second group on the first substrate 2. Also, as shown in FIGS. 1B and 1C, each of the connecting pads 26 in the fourth group crosses the spare line 28 with an insulating layer 34 interposed between them. It should be noted that the vertical positional relationship between the connecting pads 26 in the fourth group and the spare line 28 is not limited to that shown in FIG. 1C. Alternatively, the connecting pads 26 in the fourth group, insulating layer 34 and spare line 28 may be stacked in this order on the substrate 4.

Each of the connecting pads 24 in the third group on the second substrate 4 is electrically connected to its associated connecting pad 10 in the first group on the first substrate 2 with an anisotropic conductive material (not shown). In the same way, each of the connecting pads 26 in the fourth group on the second substrate 4 is electrically connected to its associated connecting pad 12 in the second group on the first substrate 2 with the anisotropic conductive material.

Figure 15A:
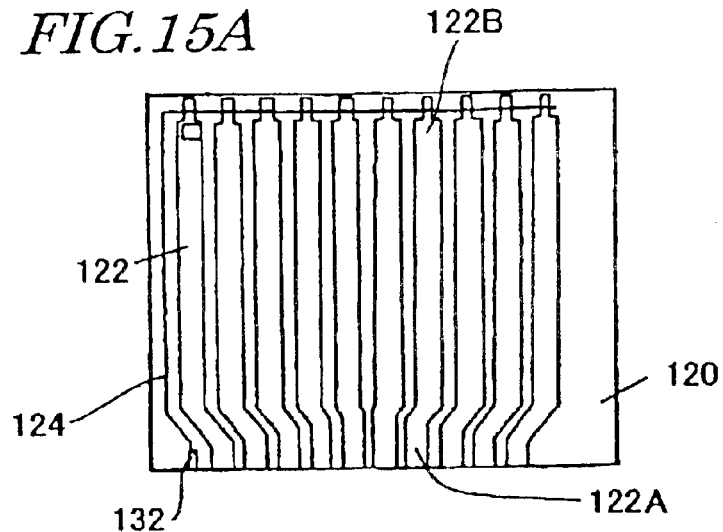
Figure 15B:
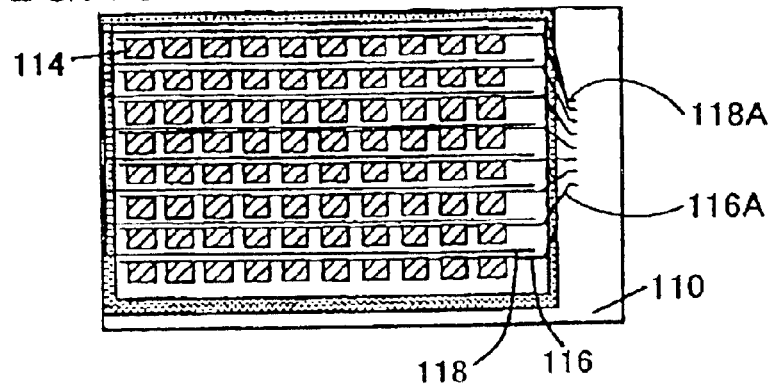
Figure 15C:
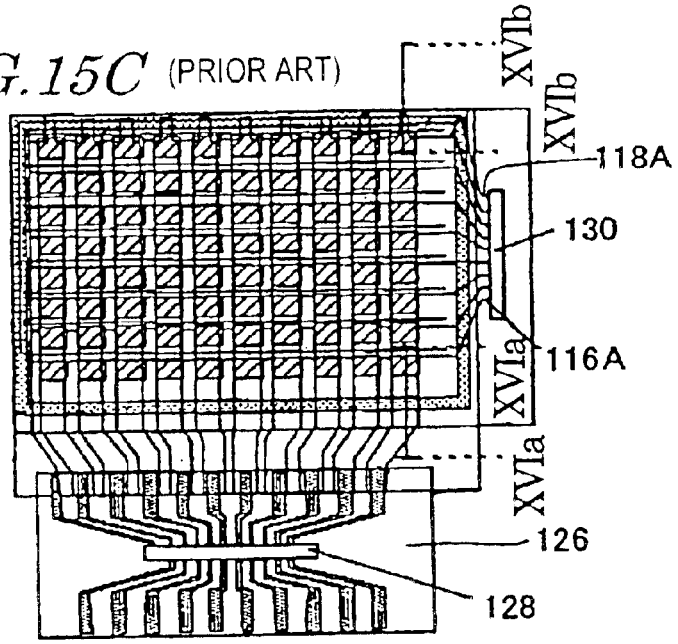
Figure 16A:
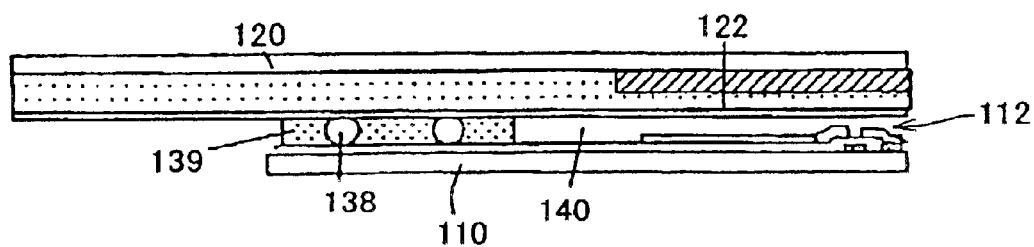
FIGS. 16A and 16B are cross-sectional views of the liquid crystal display device shown in FIG. 15C as taken on the planes XVIb—XVIb and XVIc—XVIc, respectively.
Figure 16B:
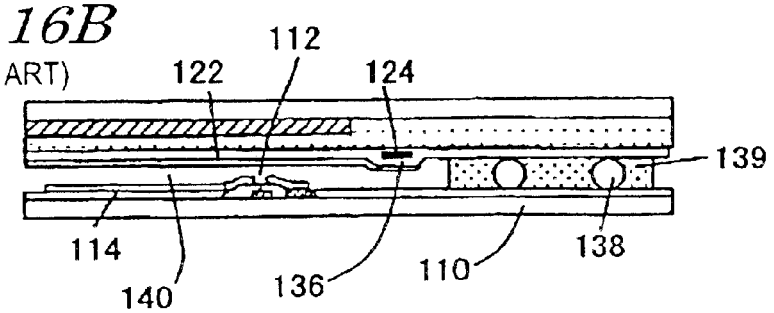

In the display device of this preferred embodiment, the spare line 28 to repair a disconnected data electrode 8 is provided on the second substrate 4, not the first substrate 2 on which the data electrode 8 is located. As already described with reference to FIGS. 15A through 15C, if the spare line is provided on the first substrate, then a conductive film needs to be deposited on the first substrate to make the spare line and an insulating film needs to be further deposited thereon to electrically isolate the data electrodes from the spare line. Thus, the manufacturing process of such a display device is adversely complicated.

In contrast, in the display device of this preferred embodiment, the spare line 28 is provided on the second substrate 4, and therefore, can be formed along with the gate lines 20 and/or reference signal lines 21 during the same manufacturing processing step. That is to say, there is no need to perform the additional process step of forming the spare line 28. Accordingly, compared to forming the spare line on the first substrate 2, the manufacturing process can be simplified.

In addition, in the display device of this preferred embodiment, the data signal input terminals 22 for the data electrodes 8 on the first substrate 2 are also provided on the second substrate 4. Specifically, a data signal is supplied from one of these input terminals 22 to its associated data electrode 8 by way of the associated connecting pad 24 in the third group on the second substrate 4, the anisotropic conductive material, and the associated connecting pad 10 in the first group on the first substrate 2.

In this manner, not just the gate lines 20 and reference signal lines 21 but also the data signal input terminals 22 for the data electrodes 8 are provided on the second substrate 4. Accordingly, a driver circuit to be connected to the gate lines 20, reference signal lines 21 and data electrodes 8 may be provided on the same substrate 4. Thus, there is no need to perform the troublesome manufacturing processing step of inverting the liquid crystal display device to mount the driver circuit. As a result, the manufacturing process can be simplified. Furthermore, since the driver circuit can be provided on the same substrate 4, the TAB technique does not have to be adopted. Consequently, it is possible to prevent the device from increasing its overall size or complexity.

Furthermore, electrical connection (or transfer) between the first and third groups of connecting pads 10 and 24 on the first and second substrates 2 and 4 and electrical connection between the second and fourth groups of connecting pads 12 and 26 on the first and second substrates 2 and 4 are done by using the anisotropic conductive material. Accordingly, each pair of connecting pads on the two different substrates may be electrically connected together just as intended without increasing the size of the device.

To input a data signal to the spare line 28, an input terminal 30 may be provided for the spare line 28 and connected to a predetermined driver circuit. Alternatively, the spare line 28 may cross the third group of connecting pads 24 with the insulating layer 34 interposed between them as will be described in detail later. In that case, if a portion of the insulating layer 34, which is located at the intersection between the spare line 28 and one of the connecting pads 24 in the third group, is selectively removed, then the spare line 28 is electrically connected to the connecting pad 24. Consequently, the data signal may be input from the data signal input terminal 22 to the spare line 28.

Next, a method of repairing disconnected one of the data electrodes 8 in the display device of this preferred embodiment will be described. In this method, first, the disconnected one is detected among the data electrodes 8. In the example illustrated in FIG. 1A, a data electrode 8X is detected as the data electrode with a disconnection 36.

Next, a portion of the insulating layer 34, which is located at the intersection between a particular connecting pad 26X, belonging to the fourth group and associated with the disconnected data electrode 8X, and the spare line 28, is selectively removed (e.g., burned off by a laser beam). In this manner, the particular connecting pad 26X is electrically connected to the spare line 28.

According to such a method, a predetermined data signal can be input to the particular connecting pad 26X by way of the spare line 28. Thereafter, the data signal may be supplied to the second end 8S of the defective data electrode 8X by way of the anisotropic conductive material between the connecting pads 26X and 12X and the connecting pad 12X in the second group. As a result, the data signal can reach the disconnected portion 36 of the data electrode 8X through the second end 8S thereof. The disconnected data electrode 8 can be repaired in this manner.

Hereinafter, specific preferred embodiments of the present invention will be described with reference to the accompanying drawings.

Embodiment 1

Figure 2A:
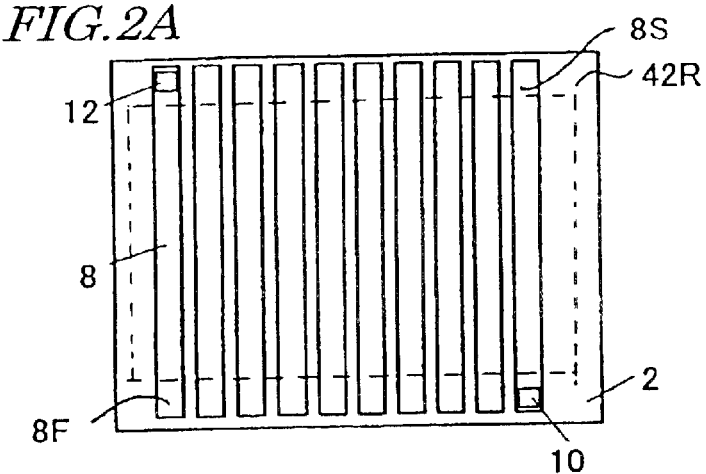
Figure 2B:
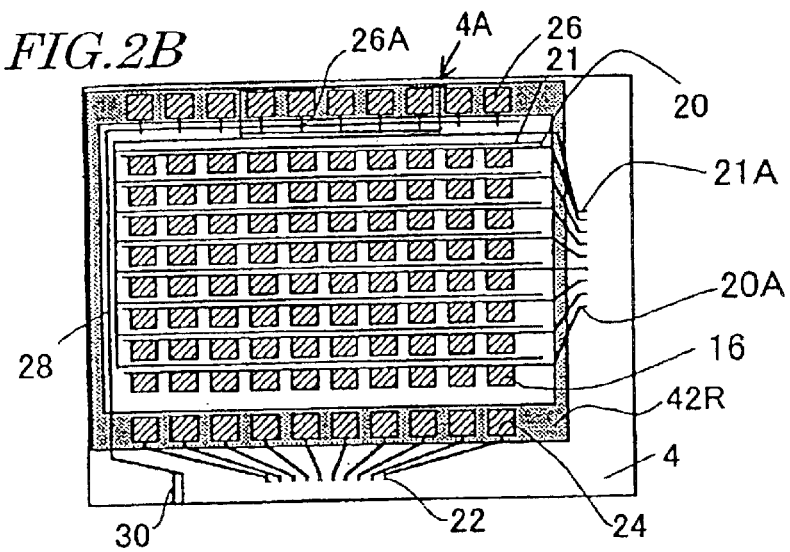
Figure 2C:
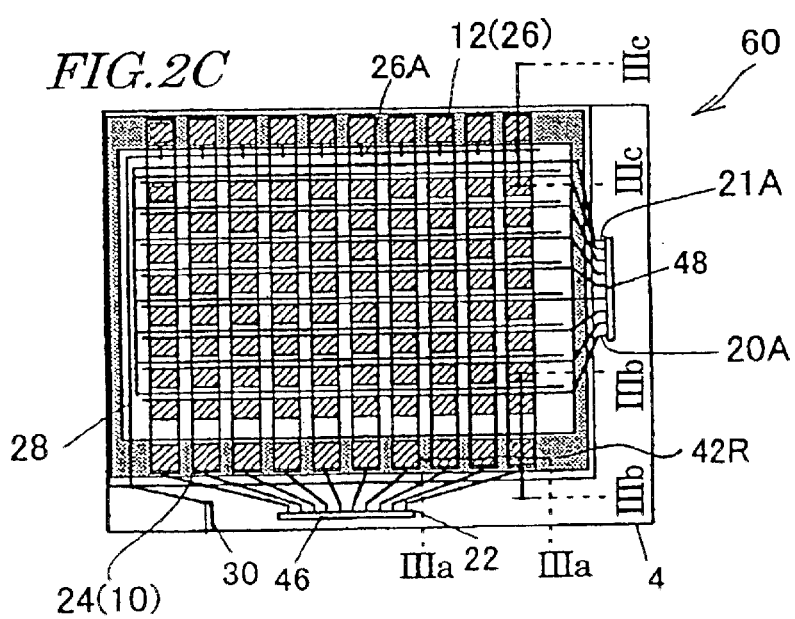
Figure 3A:
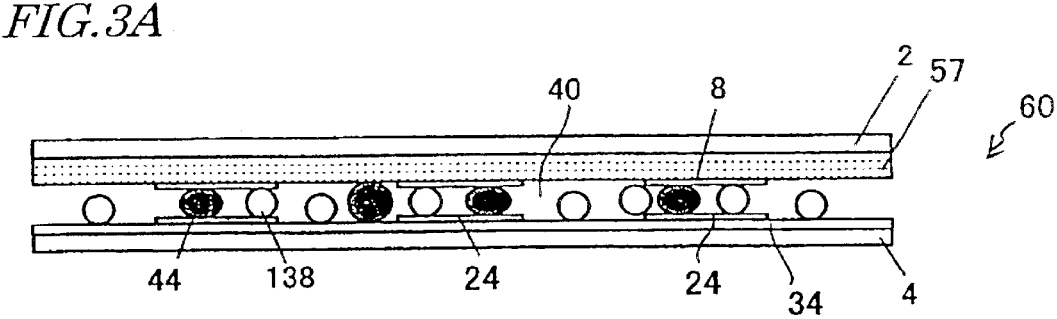
FIGS. 3A, 3B and 3C are cross-sectional views of the liquid crystal display device shown in FIG. 2C as taken on the planes IIIa—IIIa, IIIb—IIIb and IIIc—IIIc, respectively.
Figure 3B:
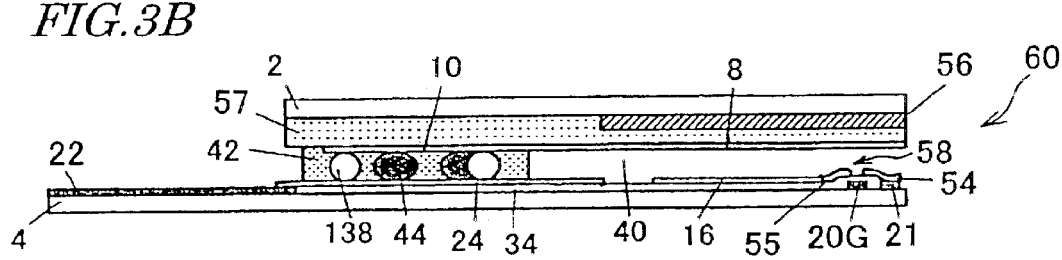
Figure 3C:
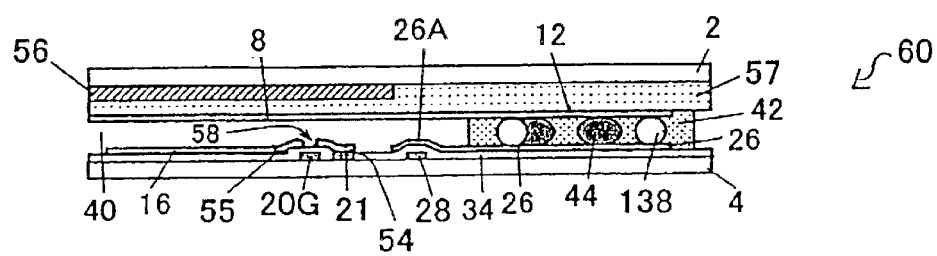

A display device according to a first specific preferred embodiment of the present invention will be described with reference to FIGS. 2A through 3C. FIG. 2A is a plan view of the first substrate of the display device, FIG. 2B is a plan view of the second substrate thereof, and FIG. 2C is a transparent plan view of the display device. FIGS. 3A, 3B and 3C are cross-sectional views of the display device shown in FIG. 2C as taken on the planes IIIa—IIIa, IIIb—IIIb and IIIc—IIIc, respectively.

The display device of this first preferred embodiment is implemented as a liquid crystal display device 60, which includes the first substrate 2, the second substrate 4 and a liquid crystal layer 40 interposed between the first and second substrates 2 and 4.

As shown in FIG. 2A, multiple striped data electrodes 8 are provided on the first substrate 2. The first group of connecting pads 10, second group of connecting pads 12 and data electrodes 8 are combined together.

On the second substrate 4, the pixel electrodes 16, gate lines 20, reference signal lines 21, switching elements (such as TFTs) 58 (not shown in FIG. 2B), data signal input terminals 22, third group of connecting pads 24, fourth group of connecting pads 26 and spare line 28 are provided as shown in FIG. 2B. In case of disconnection, a data signal that should have been supplied to one of the data electrodes 8 may be input through this spare line 28 by way of its input terminal 30.

As shown in FIG. 3C, the spare line 28 is made of the same metal layer of Ta, Al, Cr, Ti, Mo or Cu, for example, as the gate electrode 20G of the TFT 58, the gate line 20 and the reference signal line 21. Accordingly, there is no need to newly deposit any additional conductive film to form the spare line 28. Thus, compared to the situation where the spare line 28 is provided on the first substrate 2, this liquid crystal display device can have a simplified structure. At intersecting portions 26A, this spare line 28 crosses the fourth group of connecting pads 26 with an insulating layer 34 interposed between them as shown in FIG. 3C.

The first and second substrates 2 and 4 are bonded together with a seal member 42 in a seal region 42R, which is located around the periphery of the substrates 2 and 4, as shown in FIGS. 2C, 3B and 3C. The first and second groups of connecting pads 10 and 12 on the first substrate 2 and the third and fourth groups of connecting pads 24 and 26 on the second substrate 4 are all located inside this seal region 42R.

The seal member 42 includes not only spacers 138 for use to maintain a predetermined gap between the substrates 2 and 4 but also particles 44 of an anisotropic conductive material. The anisotropic conductive particles 44 may be plastic particles having some elasticity and a diameter of about 7 $\mu$m. The surface of those plastic particles is plated with gold with a thickness of about 0.1 $\mu$m. The anisotropic conductive particles 44 have some elasticity. Accordingly, when the first and second substrates 2 and 4 are bonded together, the anisotropic conductive particles 44 contact with, and are deformed to a certain degree between, the second and fourth groups of connecting pads 12 and 26 or the first and third groups of connecting pads 10 and 24 as shown in FIGS. 3A through 3C. As a result, a sufficient area of contact is ensured between each pair of connecting pads and the anisotropic conductive particles 44. That is to say, the first and third groups of connecting pads 10 and 24 or the second and fourth groups of connecting pads 12 and 26 are electrically connected together just as intended. If good electrical connection cannot be established between any pair of connecting pads, then the signal to be supplied to its associated data electrode 8 may have a rounded edge. In this embodiment, however, such unwanted edge rounding can be eliminated.

Supposing the average number of anisotropic conductive particles 44 that are dispersed in a unit area (mm$^2$) of the seal member 42 is D and the sealed area of each pair of connecting pads 10 and 24, belonging to the first and third groups (i.e., the area of a transfer portion), is 5 mm$^2$, $1,000 \geq D > 5/S$ is preferably satisfied. More preferably, $600 \geq D > 5/S$ is satisfied. Even more preferably, $400 \geq D > 5/S$ is satisfied.

If the average number of anisotropic conductive particles 44 dispersed per unit area falls within this range, then the anisotropic conductive particles 44 will adhere to the connecting pads sufficiently strongly, the gap between the substrates can be kept uniform, and the conductive particles will not coagulate together to increase the leakage between the lines. Accordingly, even under a high-temperature humid environment, the reliability of the liquid crystal display device would not decrease. As a result, high-resolution and narrow-pitch liquid crystal display devices can be produced at a high yield.

The first and third groups of connecting pads 10 and 24 are electrically connected together with such anisotropic conductive particles 44 and the second and fourth groups of connecting pads 12 and 26 are also electrically connected together with the anisotropic conductive particles 44.

Figure 4A:
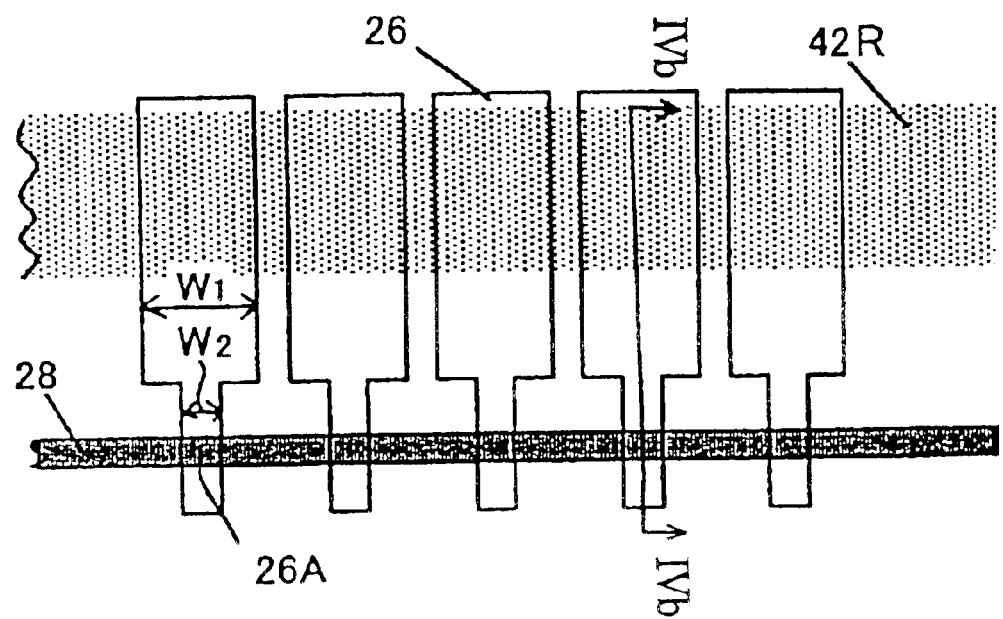
FIG. 4A is a partial plan view showing an exemplary fourth group of connecting pads.
Figure 4B:
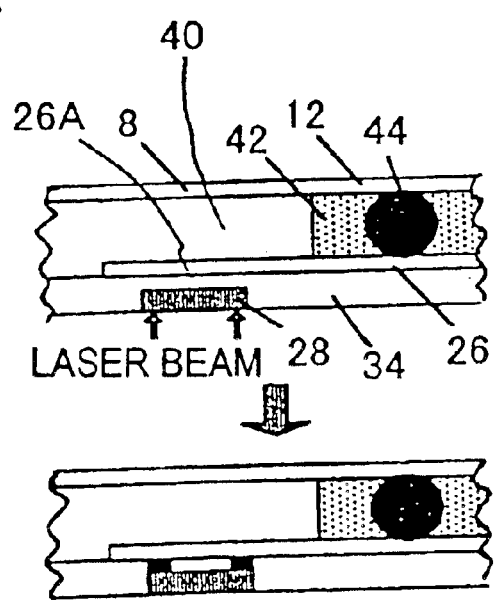
FIG. 4B illustrates cross-sectional views of the liquid crystal display device as taken on the plane IVb—IVb shown in FIG. 4A.

Next, a preferred planar shape of the connecting pads 26 in the fourth group will be described with reference to FIGS. 4A and 4B. FIG. 4A is a plan view showing the region 4A shown in FIG. 2B on a larger scale. FIG. 4B illustrates cross-sectional views of the liquid crystal display device as taken on the plane IVb—IVb shown in FIG. 4A. In FIG. 4B, the illustration of the substrates 2 and 4 is omitted for the sake of simplicity.

As shown in FIG. 4A, each of the connecting pads 26 in the fourth group includes a first portion with a first width W41 and a second portion with a second width W42, which is smaller than the first width W41. The first and second widths W41 and W42 are measured in the row direction. The second portion of the connecting pads 26 crosses the spare line 28. That portion of the connecting pads 26 that crosses the spare line 28 will be referred to herein as an intersecting portion 26A. The intersecting portion 26A is located outside of the seal region 42R and inside of the region where the liquid crystal layer 40 is provided (i.e., inside of the display area). As shown in FIG. 4B, the intersecting portion 26A of the connecting pad 26 crosses the spare line 28 with the insulating layer 34 interposed between them.

When the connecting pads 26 in the fourth group have the shape shown in FIG. 4A, the following effects are achieved.

Firstly, if the intersecting portion 26A of the connecting pad 26 with the spare line 28 has a wide area, then a capacitance will be created between the connecting pad 26 and the spare line 28 by way of the insulating layer 34, thus possibly causing a signal propagation delay. Accordingly, if the intersecting portion 26A of the connecting pad 26 with the spare line 28 has a reduced area as shown in FIG. 4A, then the capacitance to be created between the connecting pad 26 and the spare line 28 can be decreased. In the liquid crystal display device 60 of the "data-to-counter-electrode" type, the data electrodes 8 are provided for one substrate 2, while the gate lines 20 and reference signal lines 21 are provided for the other substrate 4. Thus, no capacitance is created between the data electrodes 8 and the gate lines 20 or between the data electrodes 8 and the reference signal lines 21. Thanks to this advantageous feature, this liquid crystal display device 60 can be implemented as a display device of a big size. For that reason, to make use of this feature of the 'data-to-counter-electrode' type liquid crystal display device 60 more fully, the intersecting portion 26A of the connecting pad 26 with the spare line 28 preferably has a reduced area such that capacitance to be created between the connecting pad 26 and the spare line 28 is minimized.

Also, each pair of connecting pads 12 and 26 belonging to the second and fourth groups is electrically connected together with the anisotropic conductive particles 44 that are dispersed in the seal member 42 as described above. Accordingly, if the surface areas of these connecting pads 12 and 26 are increased, then a greater number of anisotropic conductive particles 44 can be present between the connecting pads 12 and 26. In that case, those connecting pads 12 and 26 can be electrically connected together more tightly. For that reason, if the first width W41 is increased (i.e., if the first portion has an increased area such that the connecting pads 12 and 26 are electrically connected together in a greater area), then the connecting pads 12 and 26 can be electrically connected together more tightly. In addition, if the first portion has an increased area, the connecting pads 12 and 26 can be electrically connected together more tightly even without increasing the number of normally expensive anisotropic conductive particles 44 per unit area.

As described above, if each of the connecting pads 26 in the fourth group has the first and second portions with the first and second widths W41 and W42, respectively (where W41>W42), such that the first portion faces its associated connecting pad 12 of the second group and that the second portion crosses the spare line 28, then the connecting pads 12 and 26 can be electrically connected together more tightly. In addition, the capacitance to be created between those connecting pads 12 and 26 can be reduced, and the delay of the signal to be propagated through the spare line 28 can be minimized.

It should be noted that the spare line 28 is provided so as to extend along a narrow peripheral region of the substrate (which region will be referred to herein as a "picture frame area"). Also, the number of spare lines 28 to be provided may be equal to the number of disconnected data electrodes 8 to be repaired. Accordingly, the number and line width of spare lines 28 to be provided are appropriately determined according to the size of the picture frame area or the resistance value of the spare lines 28 themselves.

The planar shape of the connecting pads 26 in the fourth group is not limited to that shown in FIG. 4A but may be any of the shapes to be described below. Hereinafter, other preferred planar shapes of the connecting pads 26 in the fourth group will be described with reference to FIGS. 5A through 7C. Each of the connecting pads 26 shown in FIGS. 5A through 7C is provided, and crosses the spare line 28, inside of the seal region 42R.

In repairing a disconnected data electrode 8, a portion of the insulating layer 34 between its associated connecting pad 26 and the spare line 28 is fused and burned off by a laser beam. In that case, chips of the insulating layer 34 or the conductive film that makes the connecting pad 26 or spare line 26 might be scattered around and float in the liquid crystal layer 40. Consequently, the reliability of the liquid crystal display device 60 might decrease. For example, the data retentivity might decrease. However, if the connecting pads 26 cross the spare line 28 inside of the seal region 42R as shown in FIGS. 5A through 7C, then no chips of the insulating layer 34 will enter the liquid crystal layer 40 even when that portion of the insulating layer 34 is exposed to the laser beam. This is because the portion of the insulating layer 34 is burned off by the laser beam entirely inside of the seal region 42R. As a result, the unwanted decrease in retentivity of the liquid crystal display device is avoidable.

Furthermore, if the connecting pads 26 cross the spare line 28 inside of the seal region 42R, there is no need to provide any additional region to make the connecting pads 26 cross the spare line 28. Accordingly, the picture frame area of the display device can be reduced.

Figure 5A:
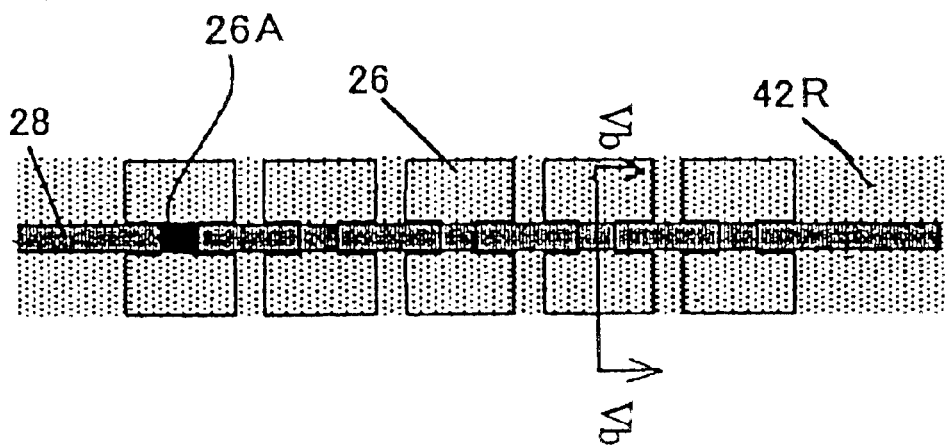
FIG. 5A is a partial plan view showing another exemplary fourth group of connecting pads.
Figure 5B:
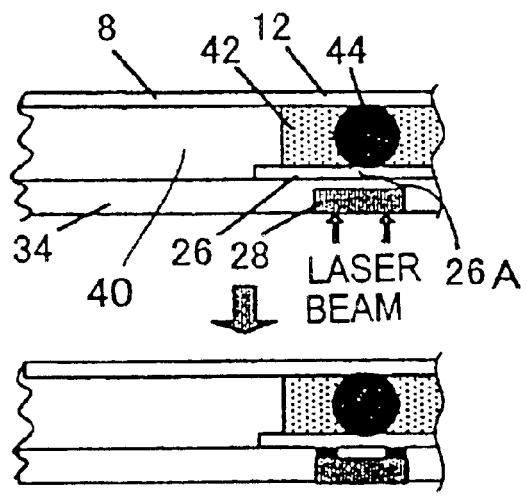
FIG. 5B illustrates cross-sectional views of the liquid crystal display device as taken on the plane Vb—Vb shown in FIG. 5A.
Figure 5C:
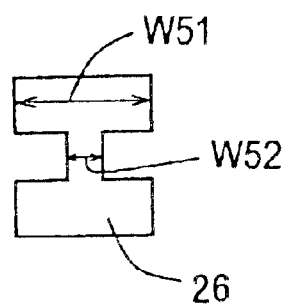
FIG. 5C schematically illustrates one of the connecting pads shown in FIG. 5A on a larger scale.
Figure 6A:
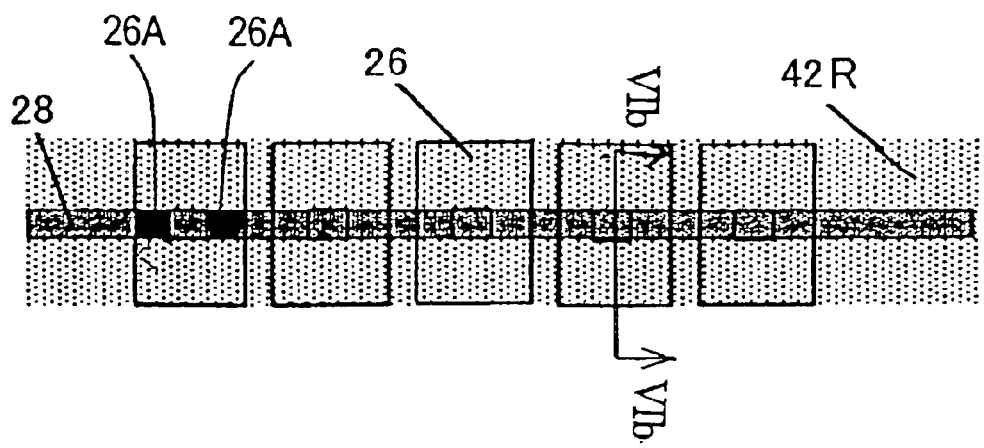
FIG. 6A is a partial plan view showing another exemplary fourth group of connecting pads.
Figure 6B:
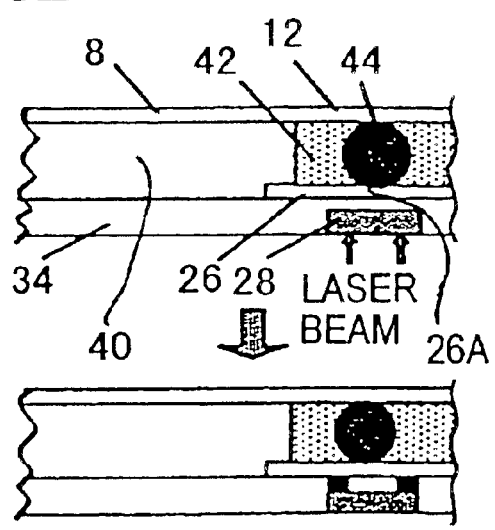
FIG. 6B illustrates cross-sectional views of the liquid crystal display device as taken on the plane VIb—VIb shown in FIG. 6A.
Figure 6C:
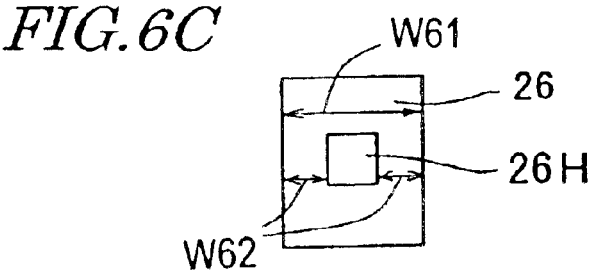
FIG. 6C schematically illustrates one of the connecting pads shown in FIG. 6A on a larger scale.
Figure 7A:
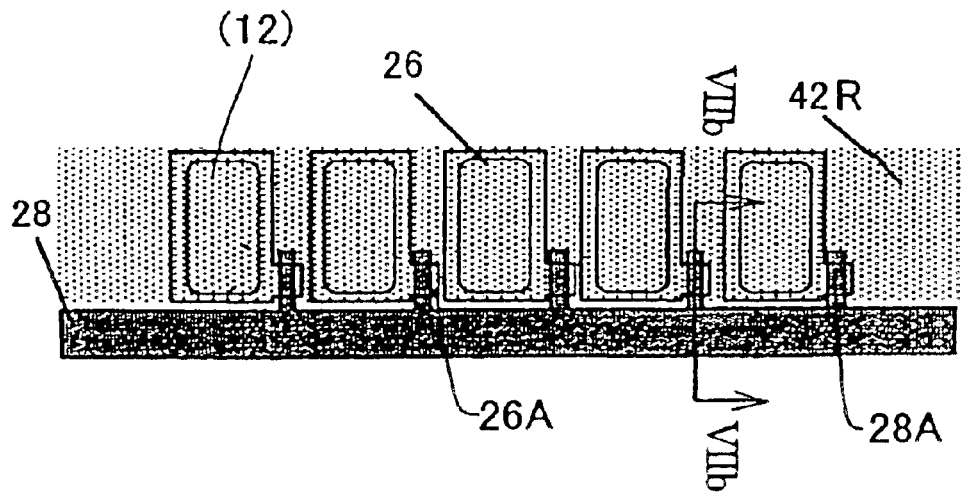
FIG. 7A is a partial plan view showing another exemplary fourth group of connecting pads.
Figure 7B:
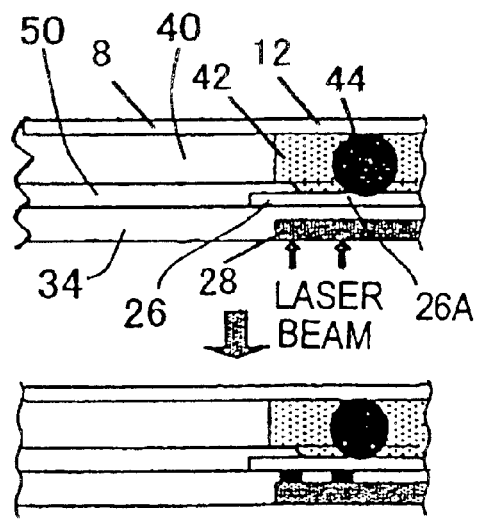
FIG. 7B illustrates cross-sectional views of the liquid crystal display device as taken on the plane VIIb—VIIb shown in FIG. 7A.
Figure 7C:
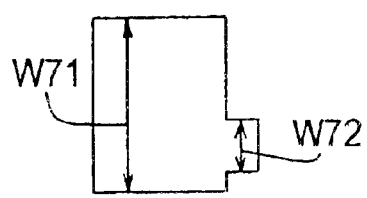
FIG. 7C schematically illustrates one of the connecting pads shown in FIG. 7A on a larger scale.
Figure 8A:
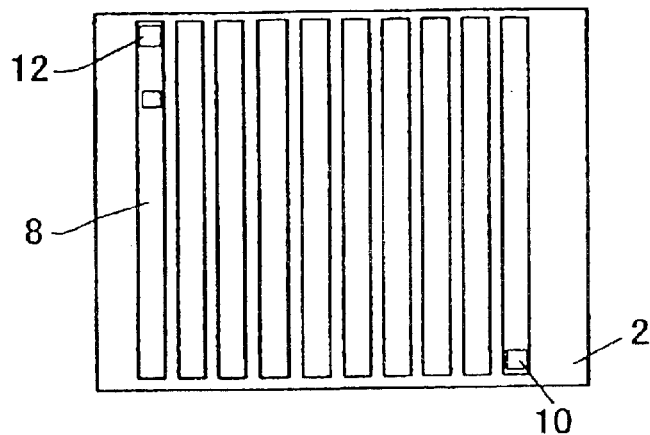
Figure 8B:
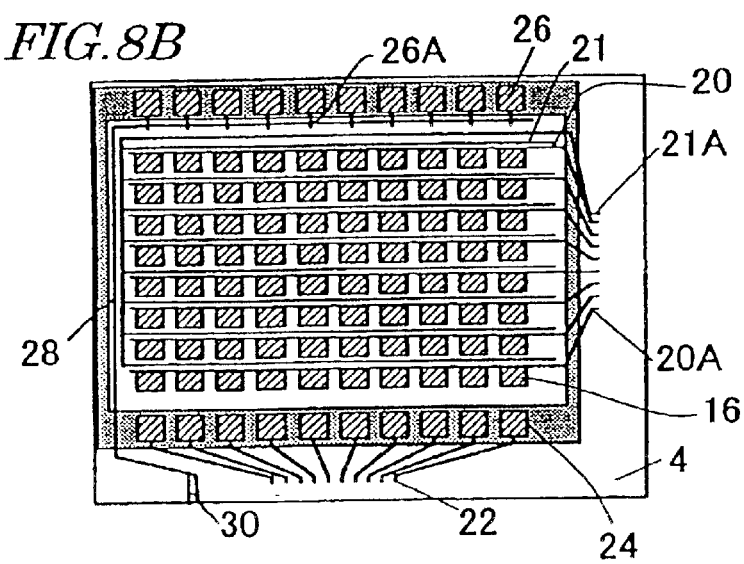
Figure 8C:
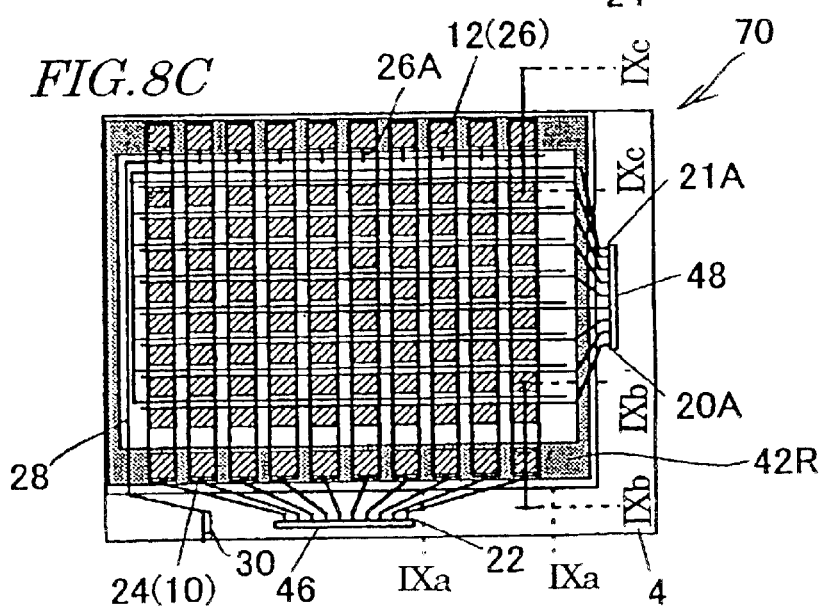

Hereinafter, specific exemplary planar shapes of the connecting pads 26 of this type will be described one by one with reference to FIGS. 5A through 7C. FIGS. 5A, 6A and 7A are plan views showing the region 4A shown in FIG. 2B on a larger scale. FIGS. 5B, 6B and 7B are cross-sectional views of the liquid crystal display device as taken on the planes Vb—Vb, VIb—VIb and VIIb—VIIb shown in FIGS. 5A, 6A and 7A, respectively. FIGS. 5C, 6C and 7C are plan views illustrating the connecting pads 26 shown in FIGS. 5A, 6A and 7A, respectively, on a larger scale. In FIGS. 5B, 6B and 7B, the illustration of the substrates 2 and 4 is omitted for the sake of simplicity.

First, the connecting pads 26 shown in FIG. 5A will be described. As shown in FIG. 5C, each of the connecting pads 26 shown in FIG. 5A includes two portions having a first width W51 in the row direction and a portion having a second width W52 in the row direction, where W52<W51. That portion of the connecting pad 26 with the second width W52 crosses the spare line 28.

If the connecting pads 26 have the shape shown in FIG. 5C, then the intersecting portion 26A of the connecting pads 26 with the spare line 28 can have a reduced area. Thus, it is possible to minimize the capacitance to be created in the insulating layer 34 between the spare line 28 and the connecting pads 26.

Next, the connecting pads 26 shown in FIG. 6A will be described. As shown in FIG. 6C, each of the connecting pads 26 shown in FIG. 6A includes an opening 26H, two portions having a first width W61 in the row direction, and two portions having a second width W62 in the row direction, where W62<W61. Those two portions of the connecting pads 26 with the second width W62 cross the spare line 28.

If the connecting pads 26 have the shape shown in FIG. 6C, then it is possible to minimize the capacitance to be created in the insulating layer 34 between the spare line 28 and the connecting pads 26. In addition, each of the connecting pads 26 can be electrically connected to the spare line 28 at the two intersecting portions 26A. Thus, the electrical connection can have increased reliability.

Furthermore, each of the connecting pads 26 shown in FIG. 6A has two intersecting portions 26A. Accordingly, even if a person has failed to repair a disconnected portion once, he or she can try to repair the same disconnected portion one more time. In addition, the two intersecting portions 26A (i.e., portions to be burned off) can be located by just a single photographing operation. Thus, the disconnection can be repaired very easily and in a shorter time. As a result, the number of repairable liquid crystal display devices per unit time can be increased, and the manufacturing cost of the liquid crystal display devices can be cut down.

Next, the connecting pads 26 shown in FIG. 7A will be described. As shown in FIG. 7C, each of the connecting pads 26 shown in FIG. 7A includes a first portion having a first width W71 in the column direction and a second portion having the second width W72 in the column direction, where W72<W71. The second portion is provided so as to protrude into the gap between two adjacent connecting pads 26. The gap may have a width of about 20 $\mu$m, for example. Also, the spare line 28 includes multiple branched portions 28A, which extend in the column direction, i.e., vertically to the row direction in which the spare line 28 extends. Those branched portions 28A of the spare line 28 cross the second portions of the connecting pads 26.

If the connecting pads 26 and the spare line 28 have the shapes shown in FIGS. 7C and 7A, respectively, then the connecting pads 26 can cross the spare line 28 with the area of the intersecting portions 26A reduced but without reducing the area of the connecting pads 26 as in the example shown in FIG. 5C or 6C. In that case, a greater number of anisotropic conductive particles can be present on each of the connecting pads 26. As a result, the fourth group of connecting pads 26 can be electrically connected to the second group of connecting pads 12 more tightly.

It should be noted that if the gap between adjacent connecting pads 26 is relatively narrow, the spare line 28 is preferably covered with an insulating film 50 as shown in FIG. 7B to minimize the leakage current that might flow between adjacent ones of the connecting pads 26. The insulating film 50 and the insulating layer 34 may be made of the same material.

Hereinafter, an exemplary method of fabricating the liquid crystal display device 60 and an exemplary method of repairing defects thereof according to this preferred embodiment will be described.

First, it will be described how to prepare the second substrate 4. As shown in FIG. 2B and FIGS. 3A through 3C, a Ta film is deposited by a sputtering process on a glass substrate and then patterned by a photolithographic process into the shapes of the gate lines 20, gate electrodes 20G, gate line input terminals 20A, reference signal lines 21, reference signal line input terminals 21A, and data signal input terminals 22. At the same time, the spare line 28 and its input terminal 30 are also formed by patterning the Ta film.

Next, a silicon nitride film to be the insulating layer 34 is deposited thereon by a plasma CVD process and then patterned by a photolithographic process, thereby removing portions of the silicon nitride film 34, and forming contact holes, over the reference signal lines 21 and data signal input terminals 22. Other portions of the silicon nitride film 34 are also selectively removed from over the input terminals 20A, 21A and 30 of the gate lines 20, reference signal lines 21 and spare line 28.

Subsequently, an intrinsic semiconductor layer of non-doped amorphous silicon and an active semiconductor layer of phosphorus (P)-doped amorphous silicon are continuously deposited in this order by a plasma CVD process, and then patterned into island shapes (not shown) by a photolithographic process. In this manner, the gate electrodes 20G are covered with these two semiconductor layers.

Thereafter, a transparent conductive film of ITO is deposited thereon by a sputtering process and then patterned by a photolithographic process into the shapes of source electrodes 54, drain electrodes 55, pixel electrodes 16 and third and fourth groups of connecting pads 24 and 26. In this process step, channel portions of the island-shaped active semiconductor layer, which are located between the source and drain electrodes 54 and 55, are removed. Also, the drain electrodes 55 and the pixel electrodes 16 are combined together such that electrical continuity is established between them. Furthermore, as shown in FIG. 3B, the source electrodes 54 are electrically connected to the reference signal lines 21 by way of the contact holes that have been provided through the silicon nitride film 34. The data signal input terminals 22 are also electrically connected to the third group of connecting pads 24 by way of the contact holes of the silicon nitride film 34. The fourth group of connecting pads 26 is formed in such a manner as to cross the spare line 28 with the silicon nitride film 34 interposed between them.

When the fourth group of connecting pads 26 shown in FIGS. 7A through 7C is formed, another silicon nitride film needs to be deposited as the insulating film 50 and then patterned into the predetermined shape.

In this manner, the second substrate 4, including the TFTs 58, pixel electrodes 16, gate lines 20 with input terminals 20A, reference signal lines 21 with input terminals 21A, data signal input terminals 22, third and fourth groups of connecting pads 24 and 26 and a spare line 28 with an input terminal 30, is obtained. As shown in FIG. 3B, each of the TFTs 58 includes the gate electrode 20G, source electrode 54 and drain electrode 55, and each of the pixel electrodes 16 is connected to one of the reference signal lines 21 by way of its associated TFT 58.

Thereafter, an alignment film (not shown) is further formed on the second substrate 4 by a printing process and then subjected to a rubbing treatment.

Hereinafter, it will be described how to prepare the first substrate 2. First, a black resin layer (not shown), an RGB color filter layer 56 and another resin layer 57 are formed in this order on a glass plate. The resin layer 57 is provided so as to increase the planarity of the first substrate 2 or its resistance to chemical agents. Next, a transparent conductive film of ITO is deposited on the resin layer 57 by a sputtering process and then patterned by a photolithographic process into the shapes of data electrodes 8 and first and second groups of connecting pads 10 and 12. In this process step, the data electrodes 8 and the first and second groups of connecting pads 10 and 12 are combined together so as to be electrically connected to each other as shown in FIGS. 3B and 3C.

Thereafter, an alignment film (not shown) is further formed on the first substrate 2 by a printing process and then subjected to a rubbing treatment.

In this manner, the first and second substrates 2 and 4 are obtained. Next, the seal member 42 is applied to the periphery of the first substrate 2 by a printing process (or with a dispenser) and then pre-baked at about 110° C. for approximately 10 minutes. Thereafter, the first substrate 2 is bonded to the second substrate 4 with spacers (e.g., plastic beads) interposed between them. Subsequently, the assembly is baked at about 180° C. for approximately 90 minutes with a pressure of about 2 kg/cm$^2$ applied thereto. Finally, a liquid crystal material is injected into the gap between the substrates 2 and 4 and then the gap is sealed with a UV curing resin.

In this preferred embodiment, the seal member 42 may be a uniform and defoamed mixture of a thermosetting epoxy resin, about 1 wt % of spacers 138 and about 2 wt % of anisotropic conductive particles 44. The spacers 138 may be made of a glass fiber with a diameter of about 6 μm. The anisotropic conductive particles 44 may be elastic plastic particles with a diameter of about 7 μm. The surface of the plastic particles may be plated with gold to a thickness of about 0.1 μm.

The seal member 42 including the anisotropic conductive particles 44 is an exemplary anisotropic conductive material. The anisotropic conductive material may be an anisotropic conductive paste (ACP) or an anisotropic conductive film (ACF). Alternatively, the seal member 42 may also be an anisotropic conductive material including no conductive particles, which may also be in the shape of paste (NCP) or film (NCF). In any case, the anisotropic conductive material preferably functions as both a seal member and a conductor. Accordingly, the resin material included in the anisotropic conductive material is preferably a resin material that is normally used for a seal member.

In the liquid crystal display device 60 obtained in this manner, the first and third groups of connecting pads 10 and 24 and the second and fourth groups of connecting pads 12 and 26 are electrically connected together with the anisotropic conductive particles 44 as shown in FIGS. 3A through 3C.

Hereinafter, an exemplary method of repairing defects of the liquid crystal display device 60 will be described.

First, the liquid crystal display device 60 is subjected to a dynamic operating inspection to detect disconnected one of the data electrodes 8. Once a data electrode 8 has been disconnected, the signal that has been input through one of the data signal input terminals 22 can advance no farther than the disconnected portion of the data electrode 8 and cannot reach its associated connecting pad 12 in the second group. Thus, no voltage is applied to the liquid crystal layer 40. If the liquid crystal display device 60 is a normally white type, the application of a black voltage (i.e., a voltage applied to display color black) to the device with such a defect allows the viewer to perceive the disconnected data electrode 8 as a bright line. A product with such a fatal defect has no commercial value. Thus, if that defect has been detected in a liquid crystal display device, the device should be subjected to the following repair process.

First, disconnected one of the data electrodes 8, which was detected as a result of the dynamic operating inspection, is located. Next, a portion of the insulating layer 34, which is located under the intersecting portion 26A of the connecting pad 26, connected to the disconnected data electrode 8, and over the spare line 28, is burned off with a laser beam, which is irradiated from under the back surface of the second substrate 4 (i.e., the surface that is not in contact with the liquid crystal layer 40) as shown in FIGS. 4B, 5B, 6B and 7B.

When the portion of the insulating layer 34, which is located under the intersecting portion 26A of the connecting pad 26 and over the spare line 28, is burned off, the surrounding portions of the spare line 28 and connecting pad 26, which are both made of a conductive film, are fused, thereby electrically connecting the spare line 28 and the connecting pad 26 together. Next, the driver circuit is connected to the input terminal 30 of the spare line 28 such that the signal that should have been supplied to the disconnected data electrode 8 is input to the spare line 28. As a result, the data signal can reach the second end 8S of the disconnected data electrode 8 as originally intended by way of the spare line 28, intersecting portion 26A, connecting pad 26, anisotropic conductive particles 44 and connecting pad 12. The defect of the liquid crystal display device can be repaired in this manner.

When the disconnection of the liquid crystal display device is repaired as described above, driver ICs 46 and 48 are connected in the subsequent mounting process step. As shown in FIG. 2C, the driver IC 48 is connected to the input terminals 20A of the gate lines 20 and the input terminals 21A of the reference signal lines 21 while the driver IC 46 is connected to the data signal input terminals 22 and the input terminal 30 of the spare line 28.

If necessary, polarizers are attached onto the upper and lower surfaces of the liquid crystal display device. Thereafter, the device is equipped with a light source (e.g., a cold cathode tube), a diffuser, a waveguide, a reflector and a control board. In this manner, the liquid crystal display device 60 of this preferred embodiment is completed as shown in FIG. 2C.

Embodiment 2

Hereinafter, a liquid crystal display device 70 according to a second specific preferred embodiment of the present invention will be described. In the liquid crystal display device 70 of this second preferred embodiment, the spare line 28 is formed along with the pixel electrodes 16 and other electrodes by patterning the same conductive film unlike the liquid crystal display device 60 of the first preferred embodiment described above. Thus, in the liquid crystal display device 70 of the second preferred embodiment, the spare line 28 is provided over the fourth group of connecting pads 26 on the second substrate 4 as opposed to the liquid crystal display device 60 of the first preferred embodiment.

Figure 9A:
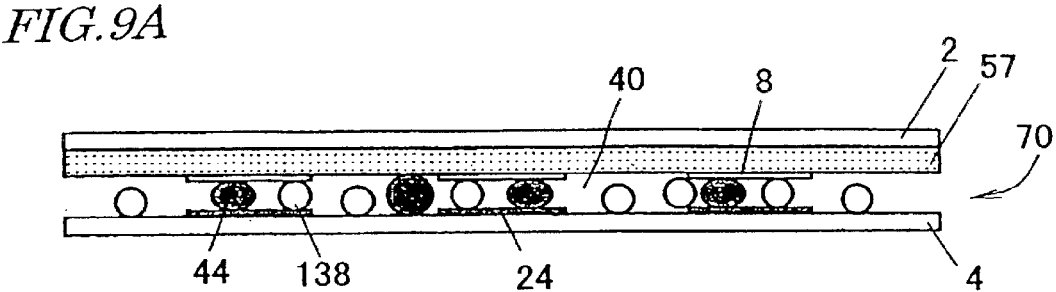
FIGS. 9A, 9B and 9C are cross-sectional views of the liquid crystal display device shown in FIG. 8C as taken on the planes IXa—IXa, IXb—IXb and IXc—IXc, respectively.
Figure 9B:
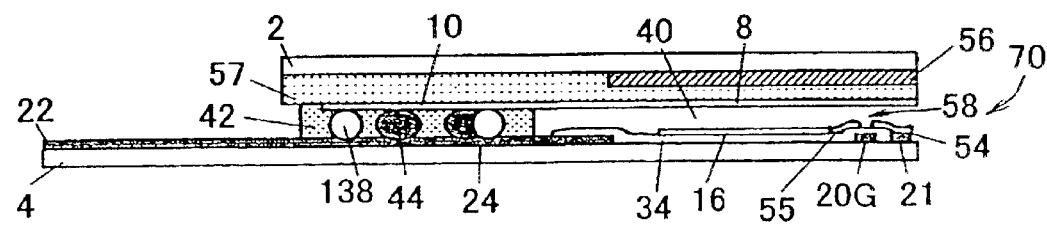
Figure 9C:
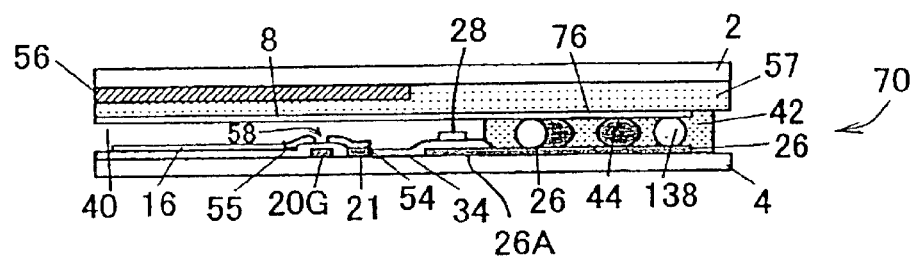

As shown in FIG. 9C, the fourth group of connecting pads 26, insulating layer 34 and spare line 28 are provided in this order on the second substrate 4 in this liquid crystal display device 70. The spare line 28 and the pixel electrodes 16 are formed simultaneously by patterning the same conductive film of ITO, for example. Accordingly, as in the liquid crystal display device 60 of the first preferred embodiment described above, there is no need to deposit any additional conductive film to make the spare line 28. Thus, compared to the conventional liquid crystal display device including the spare line 28 on the first substrate 2, the liquid crystal display device 70 can have a simplified structure.

In addition, in the liquid crystal display device 70 of this preferred embodiment, the first and third groups of connecting pads 10 and 24 and the second and fourth groups of connecting pads 12 and 26 are also electrically connected together with the anisotropic conductive particles 44 as shown in FIGS. 9A through 9C as in the liquid crystal display device 60 of the first preferred embodiment described above. Thus, each pair of connecting pads can be electrically connected together highly reliably and no edge of any data signal should be rounded.

In the liquid crystal display device 70 of this preferred embodiment, the fourth group of connecting pads 26 may also have any of various planar shapes just like the counterparts of the liquid crystal display device 60 of the first preferred embodiment described above.

Figure 10A:
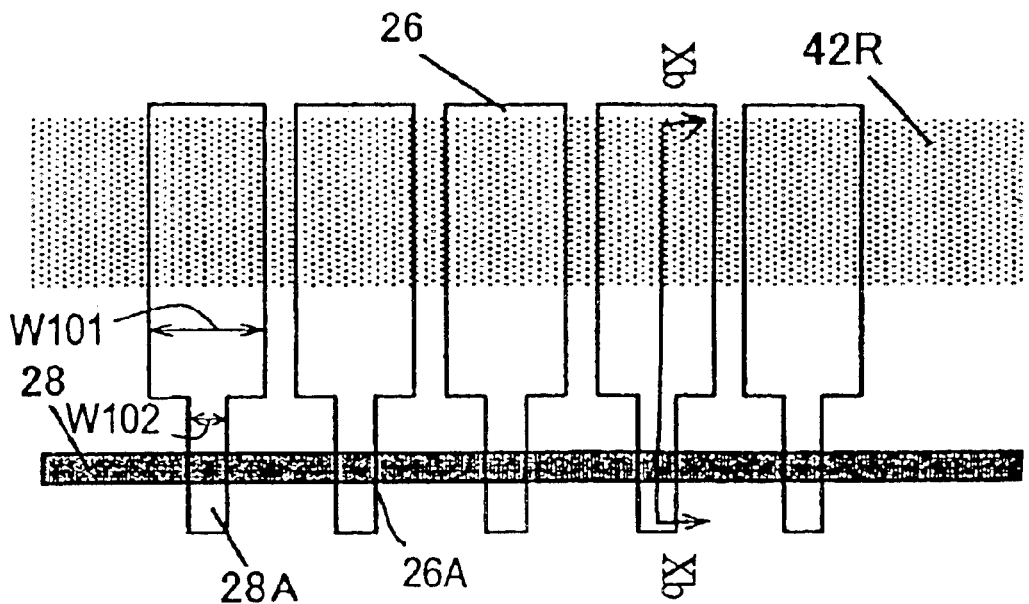
FIG. 10A is a partial plan view showing an exemplary fourth group of connecting pads.
Figure 10B:
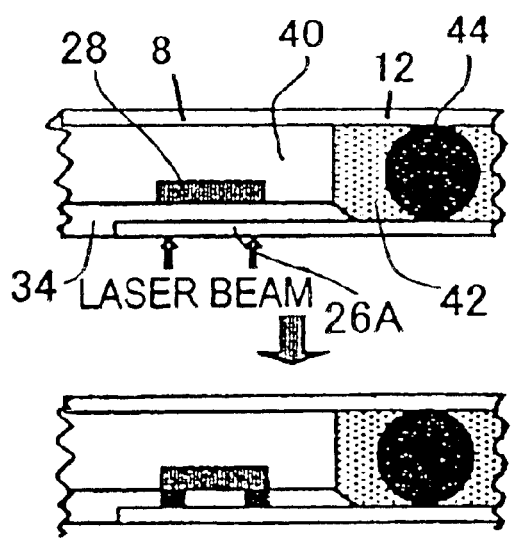
FIG. 10B illustrates cross-sectional views of the liquid crystal display device as taken on the plane Xb—Xb shown in FIG. 10A.

For example, each of the connecting pads 26 in the fourth group may include a first portion having a first width W101 in the row direction and a second portion having a second width W102 in the row direction (where W102<W101), and the second portion crosses the spare line 28 as shown in FIG. 10A. The intersecting portion 26A of each connecting pad 26 is located outside of the seal region 42R. As shown in FIG. 10B, the intersecting portion 26A of the connecting pad 26 crosses the spare line 28 with the insulating layer 34 interposed between them.

If the fourth group of connecting pads 26 have the planar shape shown in FIG. 10A, the second and fourth groups of connecting pads 12 and 26 can be electrically connected together more tightly, the capacitance to be created between them can be reduced significantly, and the delay of the signal to be propagated through the spare line 28 can be minimized as already described for the first preferred embodiment with reference to FIGS. 4A and 4B.

Alternatively, the fourth group of connecting pads 26 may also have the planar shape shown in FIG. 5A, 6A or 7A as described for the first preferred embodiment.

Hereinafter, an exemplary method of fabricating the liquid crystal display device 70 will be described.

First, it will be described how to prepare the second substrate 4.

As shown in FIG. 8B and FIGS. 9A through 9C, a Ta film is deposited by a sputtering process on a glass substrate and then patterned by a photolithographic process into the shapes of the gate lines 20, gate electrodes 20G, gate line input terminals 20A, reference signal lines 21, reference signal line input terminals 21A, data signal input terminals 22 and third and fourth groups of connecting pads 24 and 26. In this process step, the third group of connecting pads 24 and the data signal input terminals 22 are combined together so as to be electrically connected to each other.

Next, a silicon nitride film to be the insulating layer 34 is deposited thereon by a plasma CVD process and then patterned by a photolithographic process, thereby removing portions of the silicon nitride film 34, and forming contact holes, over the reference signal lines 21. Other portions of the silicon nitride film 34 are also selectively removed from over the input terminals 20A, 21A and 22 of the gate lines 20, reference signal lines 21 and data electrodes 28. Furthermore, still other portions of the silicon nitride film 34 are also removed from over the third and fourth groups of connecting pads 24 and 26 to form contact holes there.

Subsequently, an intrinsic semiconductor layer of non-doped amorphous silicon and an active semiconductor layer of phosphorus (P)-doped amorphous silicon are continuously deposited in this order by a plasma CVD process, and then patterned into island shapes (not shown) by a photolithographic process. In this manner, the gate electrodes 20G are covered with these two semiconductor layers.

Thereafter, a transparent conductive film of ITO is deposited thereon by a sputtering process and then patterned by a photolithographic process into the shapes of source electrodes 54, drain electrodes 55, pixel electrodes 16, spare line 28 and input terminal 30 thereof. In this process step, channel portions of the island-shaped active semiconductor layer, which are located between the source and drain electrodes 54 and 55, are removed. Also, the drain electrodes 55 and the pixel electrodes 16 are combined together such that electrical continuity is established between them. Furthermore, as shown in FIG. 9B, the source electrodes 54 are electrically connected to the reference signal lines 21 by way of the contact holes that are provided through the silicon nitride film 34. The spare line 28 is formed so as to be electrically connected to its input terminal 30 and to cross the fourth group of connecting pads 26 with the silicon nitride film 34 interposed between them.

In this manner, the second substrate 4, including the TFTs 58, pixel electrodes 16, gate lines 20 with input terminals 20A, reference signal lines 21 with input terminals 21A, data signal input terminals 22, third and fourth groups of connecting pads 24 and 26 and a spare line 28 with an input terminal 30, is obtained. As shown in FIG. 9B, each of the TFTs 58 includes the gate electrode 20G, source electrode 54 and drain electrode 55, and each of the pixel electrodes 16 is connected to one of the reference signal lines 21 by way of its associated TFT 58.

Thereafter, an alignment film (not shown) is further formed on the second substrate 4 by a printing process and then subjected to a rubbing treatment.

The first substrate 2 is prepared as already described for the first preferred embodiment. Then, the first and second substrates 2 and 4 obtained are bonded together as in the first preferred embodiment and a liquid crystal material is injected into the gap between the substrates 2 and 4 to complete the liquid crystal display device 70.

In this second preferred embodiment, the disconnection may be repaired as in the first preferred embodiment, and the description thereof is omitted herein.

Embodiment 3

Hereinafter, a liquid crystal display device 80 according to a third specific preferred embodiment of the present invention will be described with reference to FIGS. 11A through 12C. In the liquid crystal display device 80 of this third preferred embodiment, the spare line 28 crosses the third group of connecting pads 24, as well as the fourth group of connecting pads 26, with the insulating layer 34 interposed between them and a predetermined data signal may be input through any of the connecting pads 24 in the third group unlike the liquid crystal display device 60 or 70 of the first or second preferred embodiment described above.

Figure 11A:
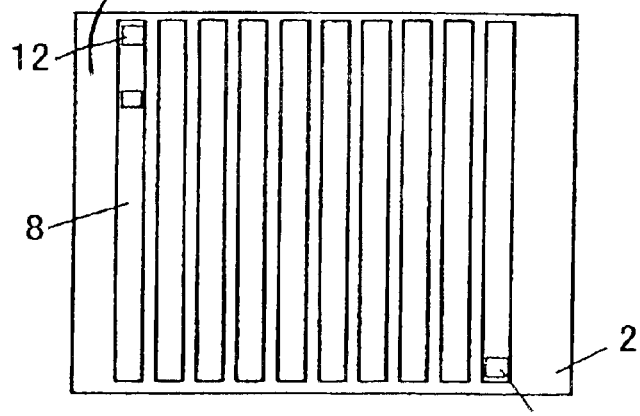
Figure 11B:
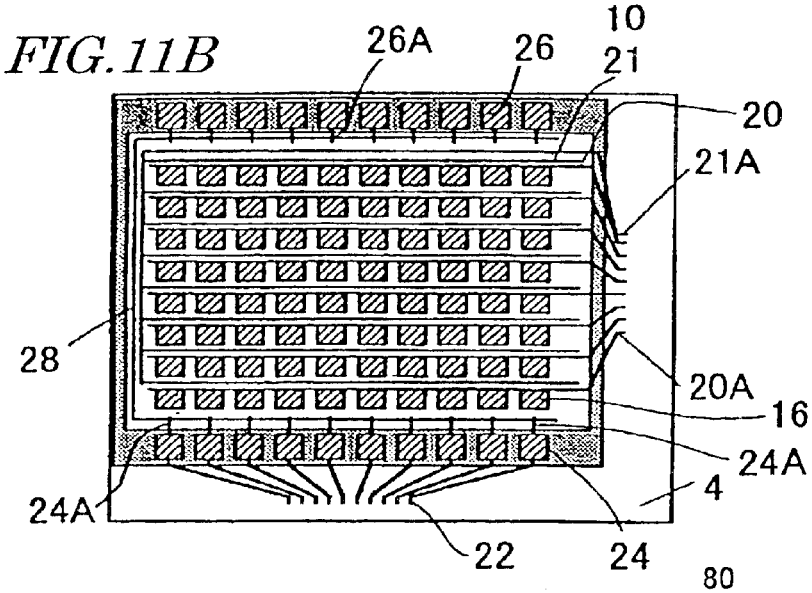
Figure 11C:
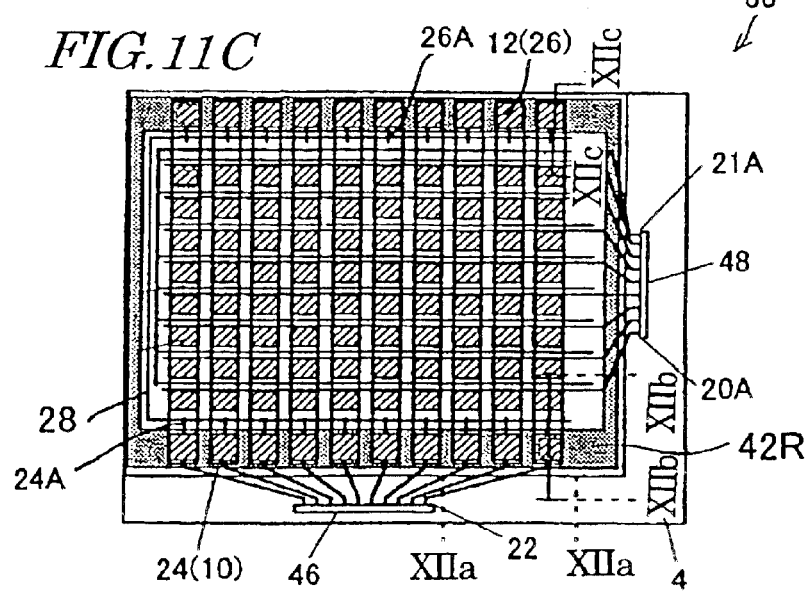

As shown in FIG. 11B, the spare line 28 on the second substrate 4 is extended along the data signal input terminals 22 so as to be located under the third group of connecting pads 24. Also, as shown in FIG. 12B, the spare line 28 crosses the third group of connecting pads 24 with the insulating layer 34 interposed between them. A predetermined data signal may be input from one of the data signal input terminals 22 to the spare line 28 by way of associated one of the connecting pads 24 in the third group. Just like in electrically connecting one of the connecting pads 26 in the fourth group to the spare line 28 as described for the first preferred embodiment, one of the connecting pads 24 in the third group may be electrically connected to the spare line 28 by burning off a portion of the insulating layer 34 between the intersecting portion of the connecting pad 24 and the spare line 28.

Accordingly, in this liquid crystal display device 80, a disconnected data electrode 8 is repaired by burning off a portion of the insulating layer 34 under one of the connecting pads 26 in the fourth group and another portion of the insulating layer 34 under associated one of the connecting pads 24 in the third group by a laser beam, for example.

In the liquid crystal display device 80 of the third preferred embodiment, a data signal may be input from one of the data signal input terminals 22 to the spare line 28 by way of associated one of the connecting pads 24 in the third group. Thus, there is no need to separately provide any circuit for inputting a data signal, which should have been supplied to the disconnected data electrode 8, to the spare line 28. Consequently, the liquid crystal display device 80 can have a simplified structure compared to the liquid crystal display device 60 or 70 of the first or second preferred embodiment described above.

Figure 12A:
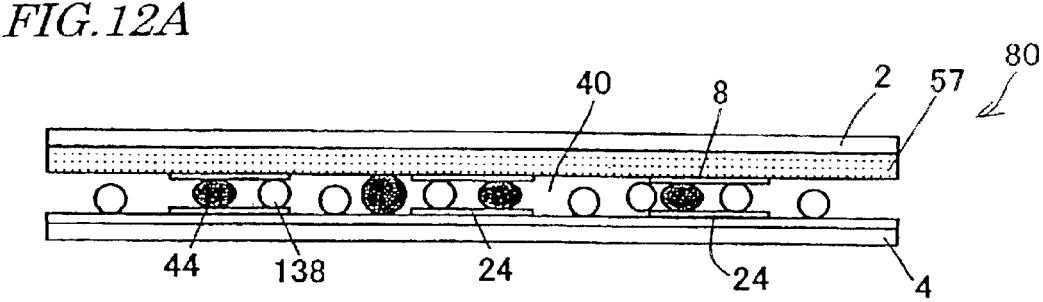
FIGS. 12A, 12B and 12C are cross-sectional views of the liquid crystal display device shown in FIG. 11C as taken on the planes XIIa—XIIa, XIIb—XIIb and XIIc—XIIc, respectively.
Figure 12B:
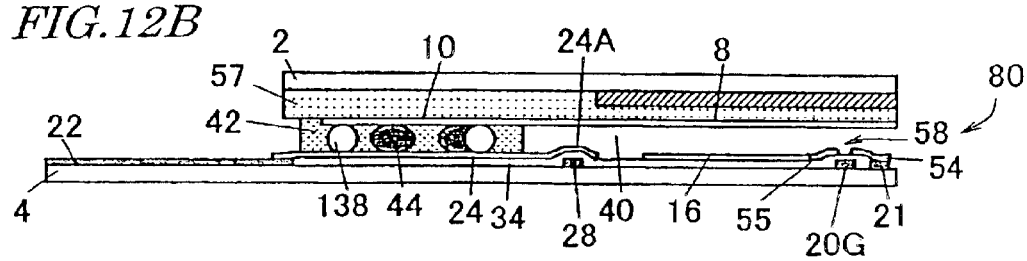
Figure 12C:
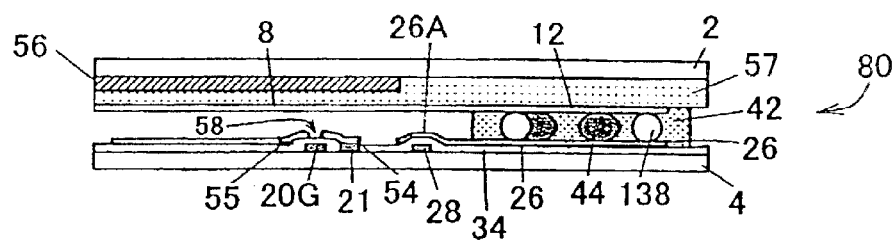
Figure 13:
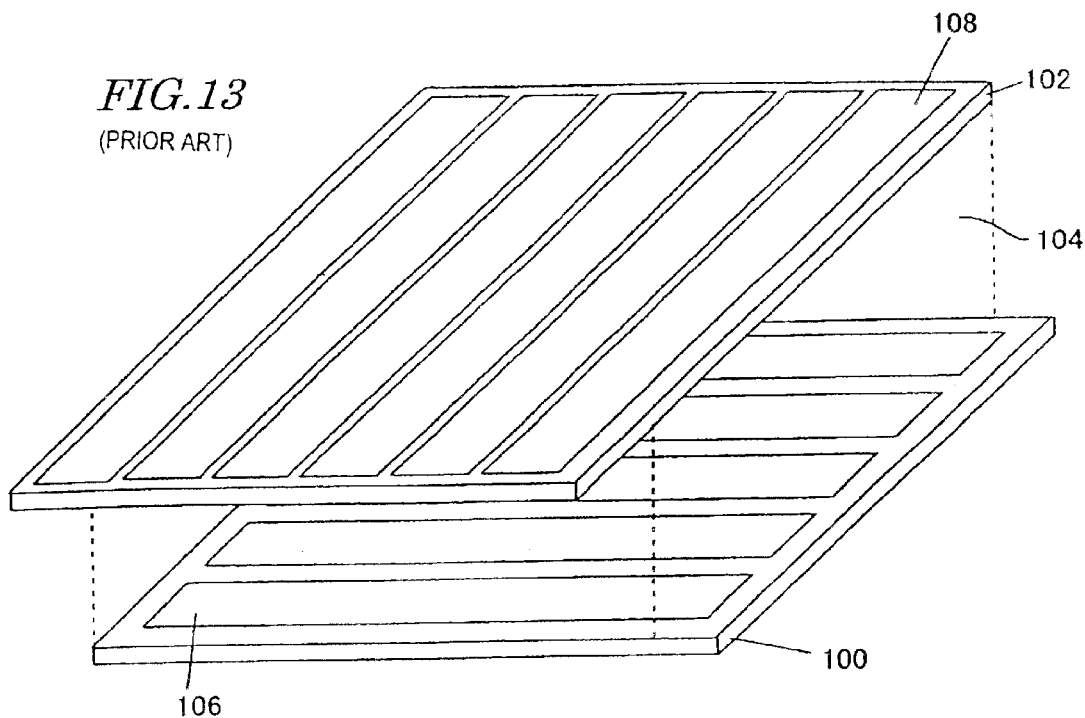
FIG. 13 is a perspective view illustrating a normal STN mode liquid crystal display device.
Figure 14:
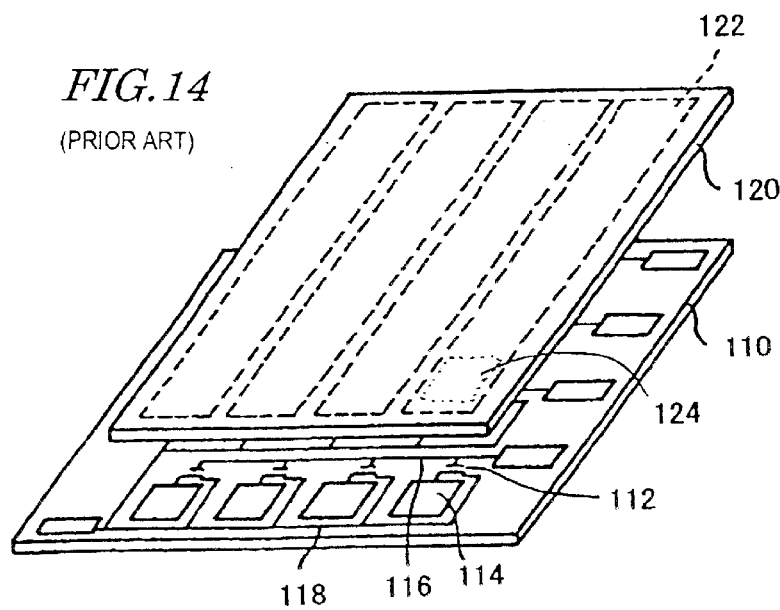
FIG. 14 is a perspective view illustrating a conventional data-to-counter-electrode type liquid crystal display device.

Also, in the liquid crystal display device 80, the spare line 28 is provided on the second substrate 4 as shown in FIGS. 12B and 12C. The spare line 28, gate lines 20, reference signal lines 21 and gate electrodes 20G are formed simultaneously by patterning the same conductive film. Accordingly, as in the liquid crystal display device 60 of the first preferred embodiment described above, there is no need to deposit any additional conductive film to make the spare line 28. Consequently, compared to the conventional liquid crystal display device including the spare line 28 on the first substrate 2, the liquid crystal display device 80 can have a simplified structure. It should be noted that the same effects are achievable even if the spare line 28, the pixel electrodes 16 and other electrodes are formed simultaneously by patterning the same conductive film as in the second preferred embodiment described above.

In addition, in the liquid crystal display device 80 of this preferred embodiment, the first and third groups of connecting pads 10 and 24 and the second and fourth groups of connecting pads 12 and 26 are also electrically connected together with the anisotropic conductive particles 44 as shown in FIGS. 12A through 12C as in the liquid crystal display device 60 of the first preferred embodiment described above. Thus, each pair of connecting pads can be electrically connected together highly reliably and no edge of any data signal should be rounded.

In the liquid crystal display device 80 of this preferred embodiment, each of the connecting pads 24 and 26 in the third and fourth groups may have the same planar shape as the fourth group of connecting pads 26 of the first or second preferred embodiment described above. Each of the connecting pads 24 and 26 in the third and fourth groups may include a first portion having the first width W41 in the row direction and a second portion having the second width W42 in the row direction (where W42<W41) as shown in FIG. 4A, for example. As shown in FIGS. 11B, 12B and 12C, the spare line 28 on the second substrate 4 crosses the second portion (i.e., the intersecting portion 24A) of each connecting pad 24 in the third group and the second portion (i.e., the intersecting portion 26A) of each connecting pad 26 in the fourth group with the insulating layer 34 interposed between them.

Alternatively, each of the connecting pads 24 and 26 in the third and fourth groups may also have the same planar shape as the connecting pad 26 shown in FIG. 5A, 6A or 7A as described for the first preferred embodiment.

Hereinafter, an exemplary method of fabricating the liquid crystal display device 80 will be described.

First, it will be described how to prepare the second substrate 4.

As shown in FIG. 11B and FIGS. 12A through 12C, a Ta film is deposited by a sputtering process on a glass substrate (insulating substrate) and then patterned by a photolithographic process into the shapes of the gate lines 20, gate electrodes 20G, gate line input terminals 20A, reference signal lines 21, reference signal line input terminals 21A, and data signal input terminals 22. At the same time, the spare line 28 is also formed by patterning the same Ta film.

Next, a silicon nitride film to be the insulating layer 34 is deposited thereon by a plasma CVD process and then patterned by a photolithographic process, thereby removing portions of the silicon nitride film 34, and forming contact holes, over the reference signal lines 21. Other portions of the silicon nitride film 34 are also selectively removed from over the input terminals 20A, 21A and 22 of the gate lines 20, reference signal lines 21 and data electrodes 8.

Subsequently, an intrinsic semiconductor layer of non-doped amorphous silicon and an active semiconductor layer of phosphorus (P)-doped amorphous silicon are continuously deposited in this order by a plasma CVD process, and then patterned into island shapes (not shown) by a photolithographic process. In this manner, the gate electrodes 20G are covered with these two semiconductor layers.

Thereafter, a transparent conductive film of ITO is deposited thereon by a sputtering process and then patterned by a photolithographic process into the shapes of source electrodes 54, drain electrodes 55, pixel electrodes 16 and third and fourth groups of connecting pads 24 and 26. Optionally, the ITO film may be replaced with a metal film of Ti, for example. Then, the resistance can be reduced. Although not mentioned, a Ti film may also be used in the first or second preferred embodiment described above.

In this process step, channel portions of the island-shaped active semiconductor layer, which are located between the source and drain electrodes 54 and 55, are removed. Also, the drain electrodes 55 and the pixel electrodes 16 are combined together such that electrical continuity is established between them. Furthermore, as shown in FIG. 12B, the source electrodes 54 are electrically connected to the reference signal lines 21 by way of the contact holes that have been provided through the silicon nitride film 34. The third and fourth groups of connecting pads 24 and 26 are formed in such a manner as to cross the spare line 28 with the silicon nitride film 34 interposed between them.

In this manner, the second substrate 4, including the TFTs 58, pixel electrodes 16, gate lines 20 with input terminals 20A, reference signal lines 21 with input terminals 21A, data signal input terminals 22, third and fourth groups of connecting pads 24 and 26 and a spare line 28, is obtained. As shown in FIG. 12B, each of the TFTs 58 includes the gate electrode 20G, source electrode 54 and drain electrode 55, and each of the pixel electrodes 16 is connected to one of the reference signal lines 21 by way of its associated TFT 58.

Thereafter, an alignment film (not shown) is further formed on the second substrate 4 by a printing process and then subjected to a rubbing treatment.

The first substrate 2 is prepared as already described for the first preferred embodiment. Then, the first and second substrates 2 and 4 obtained are bonded together as in the first preferred embodiment and a liquid crystal material is injected into the gap between the substrates 2 and 4 to complete the liquid crystal display device 80.

Various preferred embodiments of the present invention described above provide a display device with a simplified structure, including a spare line to repair a disconnection, by an easier manufacturing process. The present invention is effectively applicable for use to make a "data-to-counter-electrode" type display device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device comprising:
   a first substrate;
   a second substrate, which is disposed so as to face the first substrate; and
   a display medium layer, which is provided between the first and second substrates,
   wherein the first substrate includes:
      a plurality of striped data electrodes, each of which has a first end and a second end and which extends in a column direction;
      a first group of connecting pads, each of which is electrically connected to the first end of associated one of the data electrodes; and
      a second group of connecting pads, each of which is electrically connected to the second end of associated one of the data electrodes, and
   wherein the second substrate includes:
      a plurality of gate lines and a plurality of reference signal lines, each of the gate lines and each of the reference signal lines extending in a row direction;
      a plurality of pixel electrodes, which are arranged in matrix;
      a plurality of switching elements, each of which has its ON/OFF states controlled by a voltage applied through associated one of the gate lines and is provided between associated one of the reference signal lines and associated one of the pixel electrodes;
      a plurality of data signal input terminals, each of which receives a data signal to be supplied to associated one of the data electrodes;
      a spare line, which is used to pass the data signal to be supplied to one of the data electrodes;
      a third group of connecting pads, which is electrically connected to the data signal input terminals and which is provided so as to face the first group of connecting pads; and
      a fourth group of connecting pads, which is provided so as to face the second group of connecting pads and which crosses the spare line with an insulating layer interposed between the fourth group of connecting pads and the spare line, and
   wherein each of the connecting pads in the third group is electrically connected to associated one of the connecting pads in the first group with an anisotropic conductive material, and
   wherein each of the connecting pads in the fourth group is electrically connected to associated one of the connecting pads in the second group with the anisotropic conductive material.

2. The device of claim 1, wherein a seal region is provided between the periphery of the first substrate and the periphery of the second substrate, and
   wherein the first and second substrates are bonded together with a seal member in the seal region, the seal member including the anisotropic conductive material, and
   wherein the first, second, third and fourth groups of connecting pads are all located in the seal region.

3. The device of claim 2, wherein the spare line crosses the third group of connecting pads with the insulating layer interposed between the spare line and the third group of connecting pads.

4. The device of claim 2, wherein the spare line crosses the fourth group of connecting pads inside of the seal region with the insulating layer interposed between the spare line and the fourth group of connecting pads.

5. The device of claim 3, wherein the spare line crosses the third group of connecting pads inside of the seal region with the insulating layer interposed between the spare line and the third group of connecting pads.

6. The device of claim 2, wherein the spare line crosses the fourth group of connecting pads outside of the seal region with the insulating layer interposed between the spare line and the fourth group of connecting pads.

7. The device of claim 3, wherein the spare line crosses the third group of connecting pads outside of the seal region with the insulating layer interposed between the spare line and the third group of connecting pads.

8. The device of claim 1, wherein each of the connecting pads in the fourth group has a first portion with a first width and a second portion with a second width that is smaller than the first width, and
   wherein the second portion of each said connecting pad in the fourth group crosses the spare line.

9. The device of claim 3, wherein each of the connecting pads in the third group has a first portion with a first width and a second portion with a second width that is smaller than the first width, and wherein the second portion of each said connecting pad in the third group crosses the spare line.

10. The device of claim 8, wherein the spare line includes multiple branches that extend substantially vertically to the spare line itself, and wherein the branches of the spare line cross the second portions of the connecting pads in the fourth group.

11. The device of claim 9, wherein the spare line includes multiple branches that extend substantially vertically to the spare line itself, and wherein the branches of the spare line cross the second portions of the connecting pads in the third group.

12. The device of claim 8, wherein each of the connecting pads in the fourth group has multiple portions with the second width.

13. The device of claim 9, wherein each of the connecting pads in the third group has multiple portions with the second width.

14. The device of claim 1, wherein each of the data electrodes is combined with associated one of the connecting pads in the first group and with associated one of the connecting pads in the second group.

15. The device of claim 1, wherein the display medium layer includes a liquid crystal material or an organic EL material.

16. The device of claim 1, wherein a portion of the insulating layer, which is located at an intersection between one of the connecting pads in the fourth group and the spare line, is removed, thereby electrically connecting the connecting pad in the fourth group to the spare line.

17. The device of claim 16, wherein another portion of the insulating layer, which is located at an intersection between one of the connecting pads in the third group and the spare line, is removed, thereby electrically connecting the connecting pad in the third group to the spare line.

18. A method of repairing disconnected one of the data electrodes for the display device of claim 1, the method comprising the steps of:

detecting the disconnected data electrode; and selectively removing a portion of the insulating layer, which is present at an intersection between one of the connecting pads, belonging to the fourth group and associated with the disconnected data electrode, and the spare line, thereby electrically connecting the connecting pad in the fourth group to the spare line.

19. The method of claim 18, further comprising the step of selectively removing another portion of the insulating layer, which is present at an intersection between one of the connecting pads, belonging to the third group and associated with the disconnected data electrode, and the spare line, thereby electrically connecting the connecting pad in the third group to the spare line.

\* \* \* \* \*